United States Patent
Liu et al.

(10) Patent No.: US 11,294,379 B2
(45) Date of Patent: *Apr. 5, 2022

(54) SYSTEMS AND METHODS FOR CONTROLLING INTELLIGENT WHEELCHAIR

(71) Applicant: SICHUAN GOLDEN RIDGE INTELLIGENCE SCIENCE & TECHNOLOGY CO., LTD., Sichuan (CN)

(72) Inventors: Weirong Liu, Beijing (CN); Yin Jiao, Gothenburg (SE); Jiaxin Li, Chengdu (CN)

(73) Assignee: SICHUAN GOLDEN RIDGE INTELLIGENCE SCIENCE & TECHNOLOGY CO., LTD., Chengdu (CN)

( * ) Notice: Subject to any disclaimer, the term of this patent is extended or adjusted under 35 U.S.C. 154(b) by 318 days.

This patent is subject to a terminal disclaimer.

(21) Appl. No.: 16/469,176

(22) PCT Filed: Jan. 22, 2017

(86) PCT No.: PCT/CN2017/072100
§ 371 (c)(1),
(2) Date: Jun. 13, 2019

(87) PCT Pub. No.: WO2018/133073
PCT Pub. Date: Jul. 26, 2018

(65) Prior Publication Data
US 2019/0384300 A1    Dec. 19, 2019

(51) Int. Cl.
G05D 1/02    (2020.01)
A61G 5/04    (2013.01)
G01C 21/20   (2006.01)

(52) U.S. Cl.
CPC ............ *G05D 1/0212* (2013.01); *A61G 5/04* (2013.01); *G01C 21/20* (2013.01); *G05D 1/0231* (2013.01)

(58) Field of Classification Search
CPC ...... G05D 1/0212; G05D 1/0231; A61G 5/04; G01C 21/20; B62K 11/007
See application file for complete search history.

(56) References Cited

U.S. PATENT DOCUMENTS

| | | | |
|---|---|---|---|
| 2016/0052138 A1* | 2/2016 | Hyde | G05D 1/0257 701/3 |
| 2016/0280235 A1 | 9/2016 | Sha | |
| 2017/0123425 A1* | 5/2017 | Zhao | G06K 9/0063 |

FOREIGN PATENT DOCUMENTS

| | | |
|---|---|---|
| CN | 102600026 A | 7/2012 |
| CN | 104535966 A | 4/2015 |

(Continued)

OTHER PUBLICATIONS

International Search Report in PCT/CN2017/072100 dated Sep. 27, 2017, 4 pages.

(Continued)

*Primary Examiner* — Yuen Wong
*Assistant Examiner* — Abdalla A Khaled
(74) *Attorney, Agent, or Firm* — Metis IP LLC

(57) ABSTRACT

The present disclosure includes a system and a method for controlling a robot. The system may include a processor that performs the operations including receiving information, building a map, planning a route and generating control parameters; a movement module that executes control parameters to move around and hold sensors for sensing information; and a gimbal for holding sensors to sense information.

16 Claims, 21 Drawing Sheets

(56) References Cited

FOREIGN PATENT DOCUMENTS

| CN | 104990560 A | 10/2015 |
|---|---|---|
| CN | 205215560 U | 5/2016 |
| CN | 105809687 A | 7/2016 |
| EP | 3067770 A1 | 9/2016 |

OTHER PUBLICATIONS

Written Opinion in PCT/CN2017/072100 dated Sep. 27, 2017, 4 pages.
First Office Action in Chinese Application No. 201780079497.2 dated Feb. 3, 2020, 14 pages.
Jakob Engel et al., LSD-SLAM: Large-Scale Direct Monocular SLAM, European Conference on Computer Vision, 2014.
Raúl Mur-Artal et al., ORB-SLAM: A Versatile and Accurate Monocular SLAM System, IEEE Transactions on Robotics, 31(5): 1147-1163, 2015.

\* cited by examiner

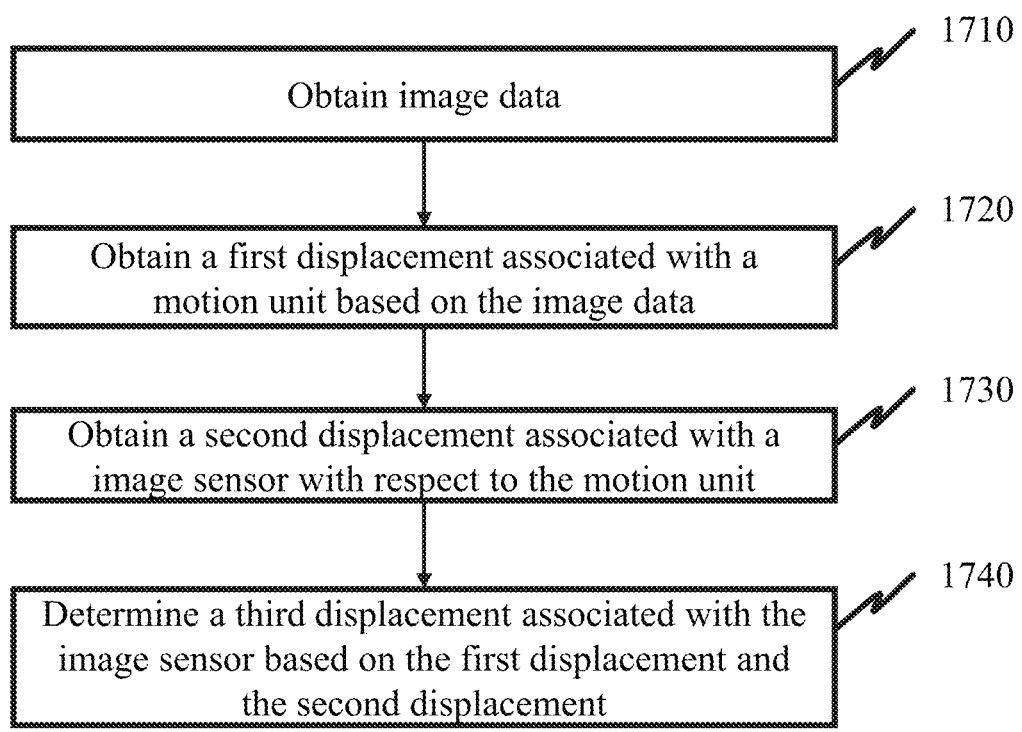
FIG. 17-A

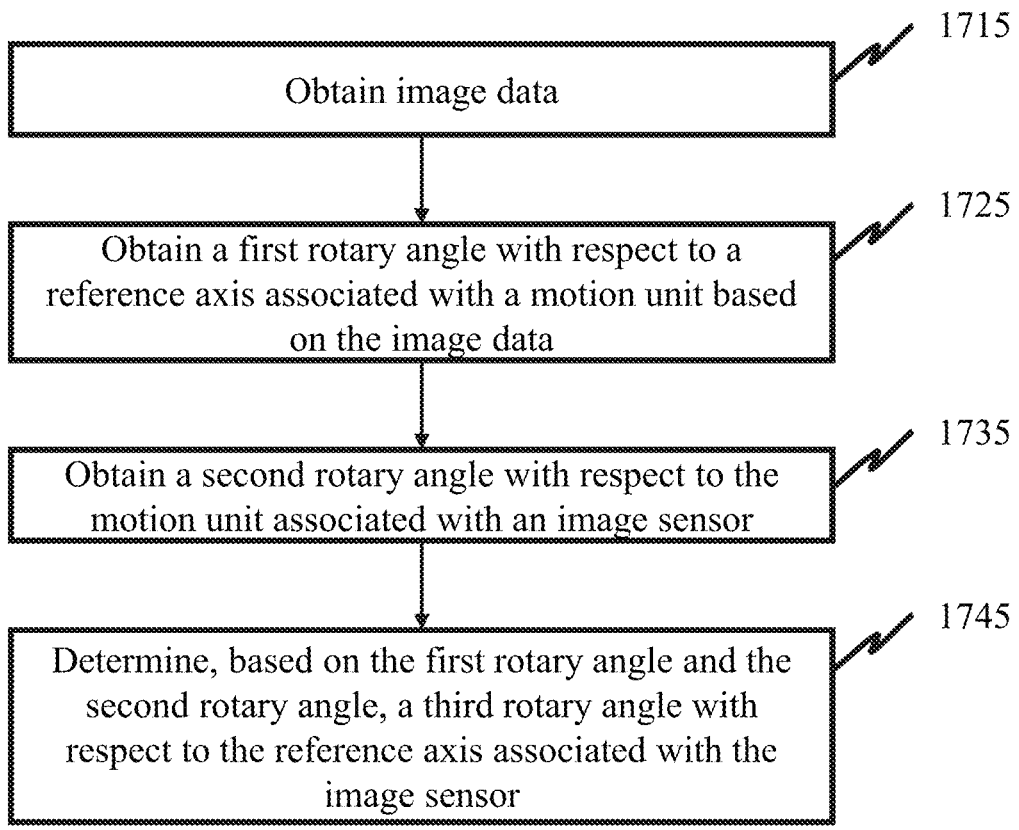
FIG. 17-B

SYSTEMS AND METHODS FOR CONTROLLING INTELLIGENT WHEELCHAIR

CROSS-REFERENCE TO RELATED APPLICATIONS

This application is a U.S. national stage under 35 U.S.C. § 371 of International Application No. PCT/CN2017/072100, filed on Jan. 22, 2017, designating the United States of America, the contents of which are incorporated herein by reference by their entireties.

TECHNICAL FIELD

The present disclosure relates to systems and methods for controlling intelligent wheelchair. Particularly, the present disclosure relates to a moving robot and a control method which controls image detecting and processing, path exploring and robot moving.

BACKGROUND

Smart devices which are capable of moving such as cleaning robot and smart balance wheel become common in daily life. To name a few, intelligent wheelchair may improve the lives of many people who use wheelchairs. Intelligent wheelchair may use a robot system to realize its functionalities and features. To provide service within an existing territory, a robot system is configured to recognize the environment and to automatically move based on an existing map. With rapid expanded service need of people, robot systems with multifunction that can update map, plan a route and move automatically are desired, and smart robots adapted with more complicated territory is more expectedly. Intelligent wheelchairs that can be aware of their surroundings and assist its user in a variety of tasks are desired.

SUMMARY

One aspect of the present disclosure is directed to a system including a memory storing instructions and a processor in communication with the memory. When executing the instructions, the processor may be configured to establish a communication with a movement module and a gimbal via communication port. The processor may be configured to obtain information from sensors held by the movement module and the gimbal to build a map. The processor may also be configured to plan a route based on the information. The processor may also be configured to generate control parameters based on the information.

Another aspect of the present disclosure is directed to a method. The method may include establishing a communication with a movement module and a gimbal via communication port. The method may include obtaining information from sensors held by the movement module and the gimbal to build a map. The method may also include planning a route based on the information. The method may also include generating control parameters based on the information.

Yet another aspect of the present disclosure is directed to a non-transitory computer readable medium embodying a computer program product. The computer program product includes a communication port that builds communication between a processor and a movement module, and communication between the processor and a gimbal. The communication port may build the communication using Application Program Interface (API).

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 17A is a flowchart of an exemplary process for determining a starting value of displacement according to an embodiment of present disclosure;

FIG. 17B shows a flowchart of an exemplary process for determining attitude of robot according to an embodiment of present disclosure;

DETAILED DESCRIPTION

Figure 1:
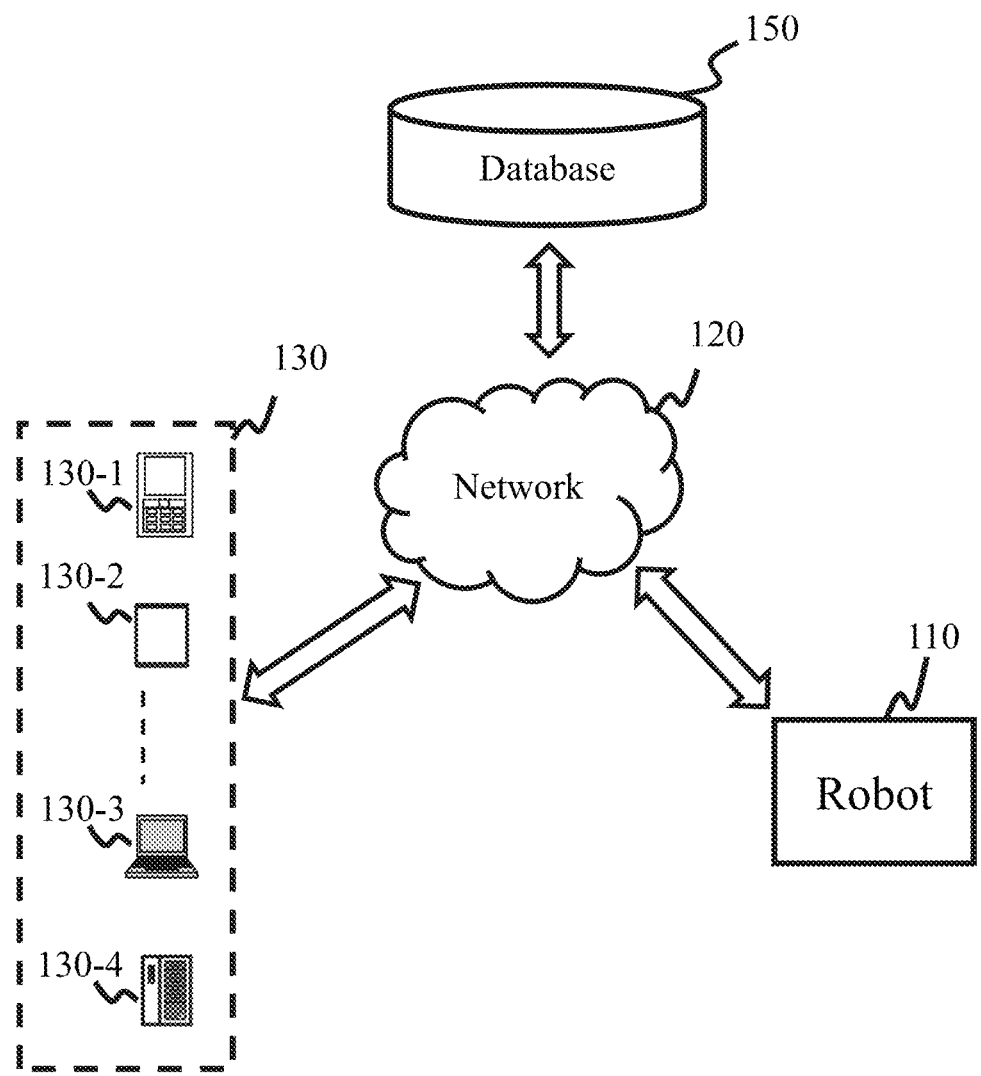
FIG. 1 is a diagram illustrating an exemplary robot control system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure.

It will be understood that the term "system," "device," "unit," and/or "module" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to" or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

Moreover, while the system and method in the present disclosure is described primarily in regard to determine a state of a robot used in intelligent wheelchairs, it should also be understood that this is only one exemplary embodiment. The system or method of the present disclosure may be applied to any other kind of smart device or vehicle. For example, the system or method of the present disclosure may be applied to different smart device systems including balance wheel, Unmanned Ground Vehicle (UGV), intelligent wheel chair, or the like, or any combination thereof. The robot systems may also include any smart system that applies management and/or distribution, for example, a system for sending and/or receiving an express, carrying people or goods to some locations.

Intelligent wheelchairs may use robots to execute the functions, such as, sensing or detecting the surroundings, moving around, lifting objects, collecting a human user's information. The term "robot," "smart device," "intelligent device," "smart robot," and "intelligent robot" in the present disclosure are used interchangeably to refer to an equipment, a device or a tool that may move and operate automatically. The term "user equipment" in the present disclosure may refer to a tool that may be used to request a service, order a service, or facilitate the providing of the service. The term "mobile terminal" in the present disclosure may refer to a tool or interface that may be used by a user to control a robot.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

The present disclosure describes a robot control system 100 as an exemplary system, and method to construct a map and plan a route for robot control system 100. The method and system as disclosed herein aim at constructing a map based on, for example, information obtained by robot control system 100. The information obtained may be captured by sensor(s) located in robot control system 100. The sensors may be optical or magnetic-electric type. For example, the sensors may be a camera or a Lidar.

FIG. 1 is a diagram illustrating an exemplary robot control system 100 according to some embodiments of the present disclosure. Robot control system 100 may include a robot 110, a network 120, a user equipment 130 and a database 140. A user may control a robot using a user equipment 130 through network 120.

Robot 110 and user equipment 130 may establish a communication. The communication between robot 110 and user equipment 130 may be wired or wireless. For example, robot 110 may establish a communication with user equipment 130 or database 140 via network 120, and that robot 110 can be controlled wirelessly based on commands of operations (e.g., commands of moving or rotating) from user equipment 130. As another example, robot 110 may be directly connected to user equipment 130 or database 140, by cable or optical fiber. In some embodiments, robot 110 may update or download maps stored in database 140 based on the communication between robot 110 and database 140. For example, robot 110 may capture information during a route. The information may be analyzed for building a map. In some embodiments, an entire map may be stored in database 140. In some embodiments, the map built by robot 110 may include information corresponding to a part of the entire map. In some embodiments, the corresponding part of the entire map may be updated by the built map. When robot 110 determines a destination and a location of itself, the entire map stored in database 140 may be accessible to robot 110. A part of the entire map including the destination and the location of robot 110 may be selected by robot 110 to plan a route. In some embodiments, robot 110 may plan a route based on the selected map, the destination and the location of robot 110. In some embodiments, robot 110 may adopt maps of user equipment 130. For example, user equipment 130 may download maps from the Internet. User equipment 130 may instruct movement of robot 110 based on maps downloaded from the Internet. For another example, user equipment 130 may download latest maps from database 140. User equipment 130 may transmit the maps obtained from database 140 to robot 110 once the destination and the location of robot 110 are determined. In some embodiments, user equipment 130 may be a part of robot 110. In some embodiments, robot 110 may plan a route based on a map built by itself if the built map includes the destination and the location of robot 110.

Network 120 may be a single network or a combination of different networks. For example, network 120 may be a local area network (LAN), a wide area network (WAN), a public network, a private network, a wireless local area network (WLAN), a virtual network, a Metropolitan Area Network (MAN), a Public Telephone Switched Network (PSTN), or any combination thereof. For example, robot 110 may communicate with user equipment 130 and database 140 via Bluetooth. Network 120 may also include various network access points. For example, wired or wireless access points such as base stations or Internet exchange points may be included in Network 120. The user may send a control operation, from user equipment 130, to robot 110 and receive results via network 120. Robot 110 may access information stored in database 140 directly or via network 120.

User equipment 130, which may be connected to network 120, may be a mobile device 130-1, a tablet computer 130-2, a laptop computer 130-3, a built-in device 130-4, or the like, or any combination thereof. In some embodiments, mobile device 130-1 may include a wearable device, a smart mobile device, a virtual reality device, an augmented reality device, or the like, or any combination thereof. In some embodiments, a user may control robot 110 by the wearable device, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device 130-4 may include an onboard computer, an onboard television, etc. In some embodiments, user equipment 130 may be a device with positioning technology for locating the position of the user and/or user equipment 130 associated with the user. For example, a route may be determined by robot 110 based on a map, a destination and a location of robot 110. The location of robot 110 may be obtained by user equipment 130. In some embodiments, user equipment 130 may be a device with image capturing ability. For example, maps stored in database 140 may be updated based on information captured by image sensor (e.g., a camera). In some embodiments, user equipment 130 may be a part of robot 110. For example, a smart phone with a camera, a gyroscope and an accelerometer may be held by a gimbal of robot 110. User equipment 130 may act as sensors to detect information. For another example, processor 210 and storage 220 may be parts of the smart phone. In some embodiments, user equipment 130 may also act as a communication interface for user of robot 110. For example, a user may touch a screen of user equipment 130 to select control operations of robot 110.

Database 140 may store an entire map. In some embodiments, there may be a plurality of robots connected with database 140 wirelessly. Each robot connected with database 140 may build a map based on information captured by its sensors. In some embodiments, the map built by a robot may be a part of the entire map. During an updating process, the built map may replace the corresponding area in the entire map. Each robot may download a map from database 140 when a route needs to be planned from a location of robot 110 to a destination. In some embodiments, map downloaded from database 140 may be a part of the entire map including at least the location of robot 110 and the destination. Database 140 may also store historical information relating to users connected with robot 110. The historical information may include, for example, the previous operation(s) by a user or the information relating to how robot 110 acts. As illustrated in FIG. 1, database 140 may be accessible to robot 110 and user equipment 130.

It should be noted that the robot control system 100 described above is merely provided for illustrating an example of the system, and not intended to limit the scope of the present disclosure.

Figure 2:
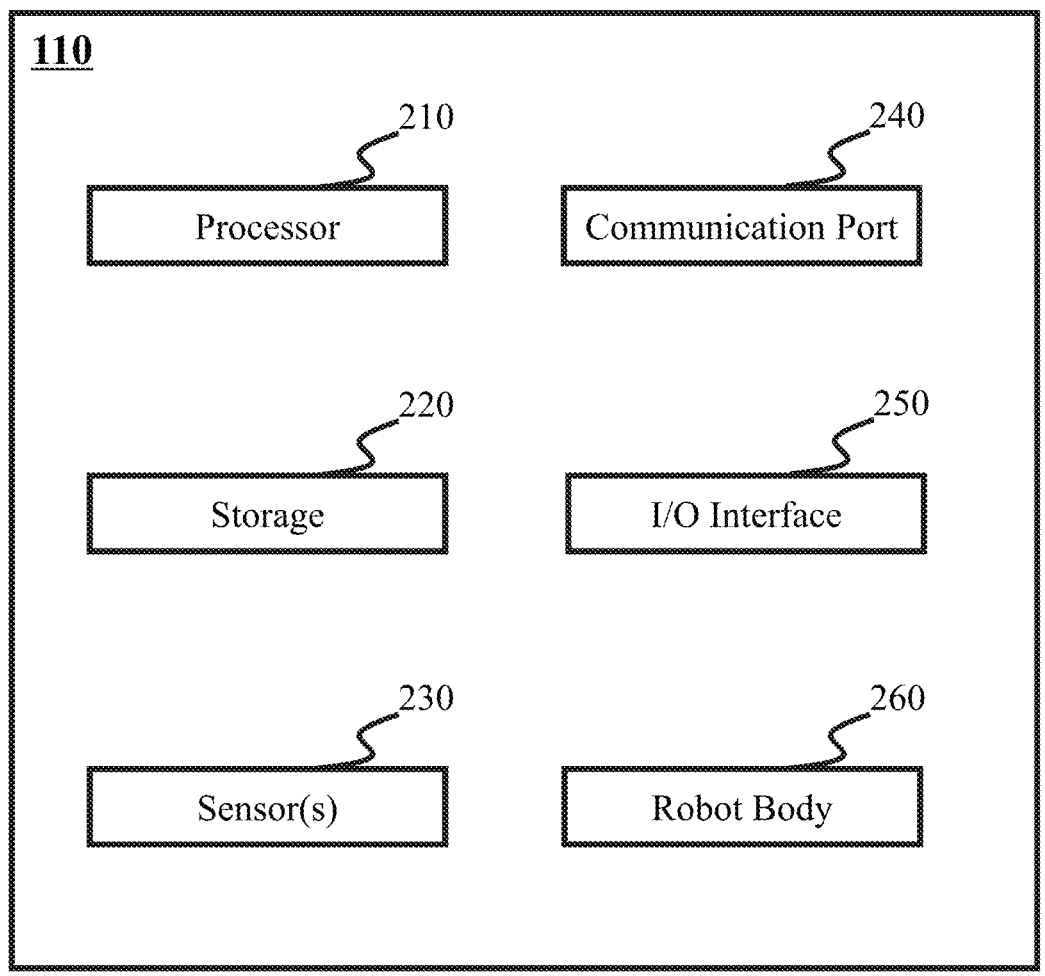
FIG. 2 is a block diagram of an exemplary robot in the robot control system illustrated in FIG. 1 according to some embodiments of the present disclosure.

FIG. 2 is a block diagram of an exemplary robot 110 in robot control system 100 illustrated in FIG. 1 according to some embodiments of the present disclosure. Robot 110 may include a processor 210, a storage 220, sensor(s) 230, communication port 240, I/O interface 250, and robot body 260. Sensor(s) 230 may obtain information. In some embodiments, the information may include image data, gyroscope data, accelerometer data, location data and distance data. Processor 210 may process the information to generate one or more results. In some embodiments, the one or more results may include displacement information and depth information (e.g., displacements of the camera within adjacent two frames, depths of an object in two adjacent frames). In some embodiments, processor 210 may build a map based on the one or more results. Processor 210 may further transmit the map to database 140 for updating. In some embodiments, processor 210 may include one or more processors (e.g., single-core processor(s) or multi-core processor(s)). Merely by way of example, processor 210 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Storage 220 may store instructions for processor 210, and when executing the instructions, processor 210 may perform one or more functions or operations described in the present disclosure. For example, storage 220 may store instructions executed by processor 210 to process the information obtained by sensor(s) 230. In some embodiments, storage 220 may automatically store the information obtained by sensor(s) 230. Storage 220 may also store the one or more results (e.g., displacement information and/or depth information for building a map) generated by processor 210. For example, processor 210 may generate the one or more results and store it in storage 220, and the one or more results may be read by processor 210 from storage 220 to build a map. In some embodiments, storage 220 may store a map built by processor 210. In some embodiments, storage 220 may store a map obtained by processor 210 from database 140 or user equipment 130. For example, storage 220 may store a map built by processor 210, then the built map may be transmitted to database 140 to update the corresponding part of the entire map. For another example, storage 220 may store temporally a map downloaded by processor 210 from database 140 or user equipment 130. In some embodiments, storage 220 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), or a digital versatile disk ROM.

Sensor(s) 230 may include any device that is capable of obtaining image data, gyroscope data, accelerometer data, location data, distance data from objects or obstacles, and any other data that can be used by robot 110 to perform various functions described in the present disclosure. For example, sensor(s) 230 may include one or more night-vision camera for obtaining image data at low light environment. In some embodiments, data and/or information obtained by sensor(s) 230 may be stored in storage 220 and may be processed by processor 210. In some embodiments, one or more of sensor(s) 230 may be installed in robot body 260. More specifically, for example, one or more image sensors may be installed in a gimbal in robot body 260. One or more navigation sensors, gyroscopes and accelerometers may be installed in both the gimbal and the movement module. In some embodiments, sensor(s) 230 may automatically explore the surroundings and detect locations under control of processor 210. For example, sensor(s) 230 may be used for dynamically sensing or detecting locations of objects, obstacles, and the like.

Communication port 240 may be a port for communication within robot 110. That is, communication port 240 may exchange information among components of robot 110. In some embodiments, communication port 240 may transmit information/data/signals of processor 210 to an internal part of robot 110 as well as receive signals from an internal part of robot 110. For example, processor 210 may receive information from sensor(s) 230 installed in robot body 260. As another example, processor 210 may transmit control operation through communication port 240 to robot body 260. The transmitting-receiving process may be realized through communication port 240. Communication port 240 may receive various wireless signals according to certain wireless communication specifications. In some embodiments, communication port 240 may be provided as a communication module for known wireless local area communication, such as Wi-Fi, Bluetooth, Infrared (IR), Ultra-Wide band (UWB), ZigBee, and the like, or as a mobile communication module, such as 3G, 4G, or Long Term Evolution (LTE), or as a known communication method for a wired communication. In some embodiments, communication port 240 is not limited to the element for transmitting/receiving signals from an internal device, and may be implemented as an interface for interactive communication. For example, communication port 240 may establish communication between processor 210 and other parts of robot 110 by circuits using Application Program Interface (API). In some embodiments, user equipment 130 may be a part of robot 110. In some embodiments, communication between processor 210 and user equipment 130 may be carried out by communication port 240.

I/O interface 250 may be an interface for communication between robot 110 and other external devices such as database 140. In some embodiments, I/O interface 250 may control data transmission from/to robot 110. For example, latest maps may be transmitted from database 140 to robot 110. For another example, a map built based on information obtained by sensor(s) 230 may be transmitted from robot 110 to database 140. I/O interface 250 may further include various additional elements, such as a wireless communication module (not shown) for wireless communication or a tuner (not shown) for turning a broadcasting signal, depending on a design type of robot 110 as well as an element for receiving signals/data from an external input. I/O interface 250 may be provided as a communication module for known wireless local area communication, such as Wi-Fi, Bluetooth, Infrared (IR), Ultra-Wide band (UWB), ZigBee, and the like, or as a mobile communication module, such as 3G, 4G, or Long Term Evolution (LTE), or as a known I/O interface for a wired communication. In some embodiments, I/O interface 250 may be provided as a communication module for known wired communication, such as optical fiber or Universal Serial Bus (USB). For example, robot 110 may exchange data with database 140 of a computer through USB interface.

Robot body 260 may be a body for holding processor 210, storage 220, sensor(s) 230, communication port 240 and I/O interface 250. Robot body 260 may perform instruction from processor 210 to move around, and to rotate sensor(s) 230 to obtain or detect information of territory. In some embodiments, robot body 260 may include a movement module and a gimbal. See the description of robot body 260 elsewhere in the present disclosure at, for example, FIG. 9 and the description thereof. In some embodiments, sensor(s) 230 may be installed in the movement module and the gimbal respectively.

Figure 3:
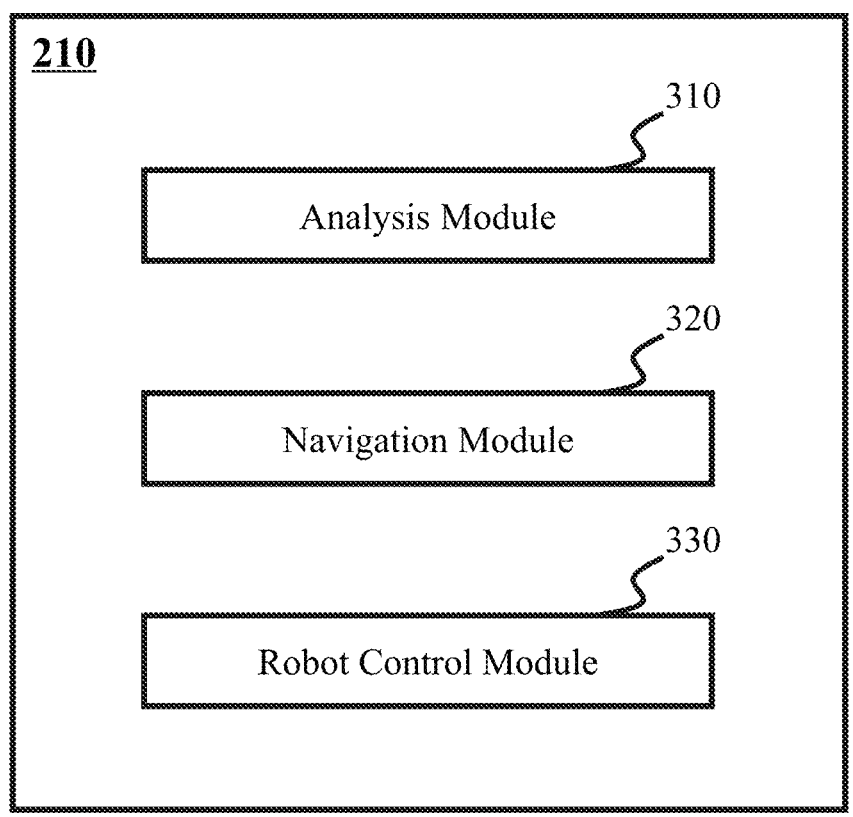
FIG. 3 is a block diagram of an exemplary processor in robot illustrated in FIG. 2 according to some embodiments of the present disclosure.

FIG. 3 is a block diagram of an exemplary processor 210 according to some embodiments of the present disclosure. As shown in FIG. 3, processor 210 may include an analysis module 310, a navigation module 320, and a robot control module 330.

Analysis module 310 may analyze information obtained from sensor(s) 230 and generate one or more results. Analysis module 310 may build a map based on the one or more results. In some embodiments, the built map may be transmitted to database 140. In some embodiments, analysis module may receive a latest map from database 140 and transmit to navigation module 320. Navigation module 320 may plan a route from location of robot 110 to a destination. In some embodiments, an entire map may be stored in database 140. The map analysis module 310 built may correspond to a part of the entire map. The updating process may be replacing the corresponding part of the entire map with the built map. In some embodiments, the map built by analysis module 310 may be latest and include the location of robot 110 and the destination. The analysis module 310 may not receive a map from database 140. The map built by analysis module 310 may be transmitted to navigation module 320 to plan a route. Robot control module 330 may generate control parameters of robot 110 based on the route planned by navigation module 320. In some embodiments, the control parameters may be temporally stored in storage 220. In some embodiments, the control parameters may be transmitted to robot body 260 to control motion of robot 110. See the description of determination of control parameters elsewhere in the present disclosure at, for example, FIGS. 6 and 7, and the description thereof.

Figure 4:
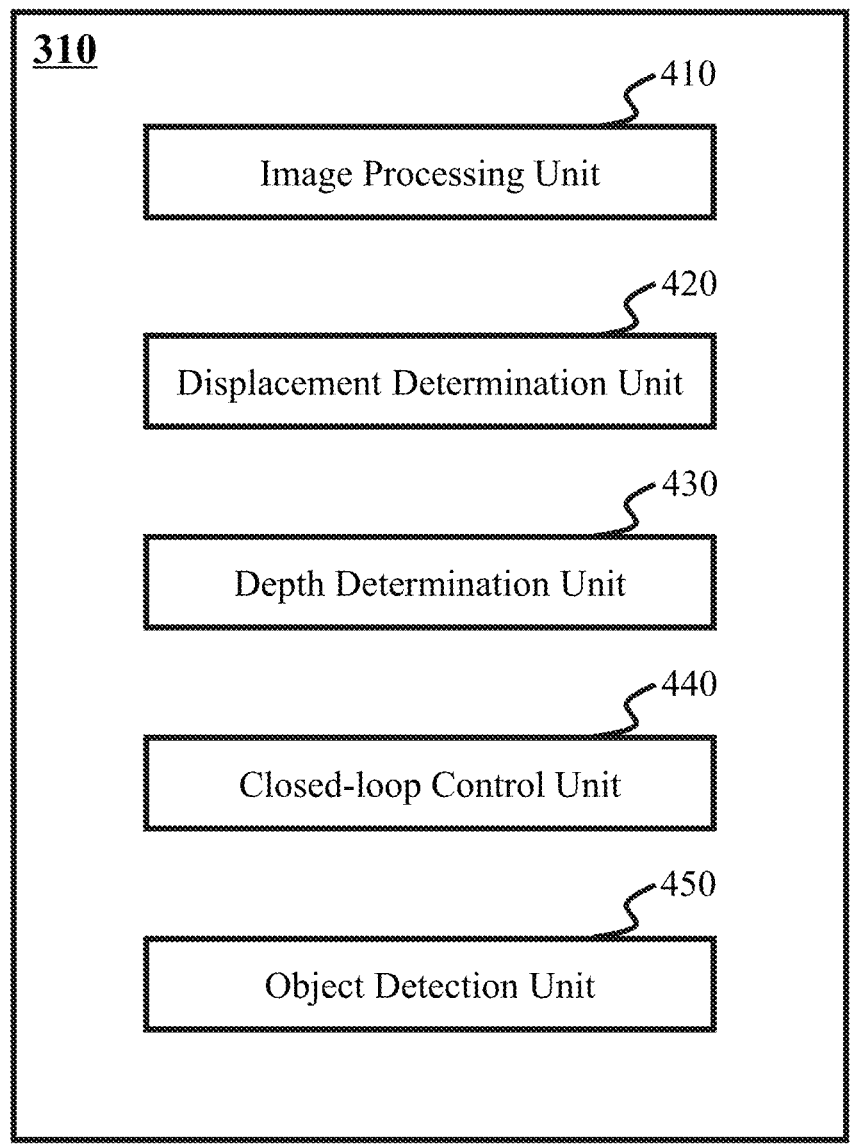
FIG. 4 is a block diagram of an exemplary analysis module in processor illustrated in FIG. 3 according to some embodiments of the present disclosure.

FIG. 4 is a block diagram of an exemplary analysis module 310 in processor 210 illustrated in FIG. 3 according to some embodiments of the present disclosure. In some embodiments, analysis module 310 may include an image processing unit 410, a displacement determination unit 420, a depth determination unit 430, a closed-loop control unit 440 and an object detection unit 450.

Image processing unit 410 may process image data to perform one or more functions of robot 110. The image data may include, for example, on or more images (e.g., still images, video frames, etc.), initial depth of each pixel in each frame and displacements, and/or any other data related to one or more images. In some embodiments, the displacements may include a displacement of wheels and a displacement of camera relative to wheels between a time interval when two adjacent frames are taken. The image data may be provided by any device that is capable of providing image data, such as sensor(s) 230 (e.g., one or more image sensors). In some embodiments, the image data may include data about multiple images. The images may include a sequence of video frames (also referred to as "frames"). Each of the frames may be a frame, a field, etc.

In some embodiments, image processing unit 410 can process image data to generate motion information of robot 110. For example, image processing unit 410 can process two frames (e.g., a first frame and a second frame) to determine differences between the frames. Image processing unit 410 can then generate motion information of robot 110 based on the differences. In some embodiments, the first frame and the second frame may be adjacent frames (e.g., a current frame and a previous frame, a current frame and a subsequent frame, etc.). Alternatively, the first frame and the second frame do not have to be adjacent frames. More particularly, for example, image processing unit 410 can determine one or more corresponding pixels in the first frame and the second frame and one or more regions including the corresponding pixels (also referred to as the "overlapping regions"). Image processing unit 410 can determine a first pixel in the first frame as being a corresponding pixel of a second pixel in the second frame in response to determining that the first pixel and the second pixel correspond to the same object. The first pixel and its corresponding pixel in the second frame (e.g., the second pixel) may correspond to the same position relative to an object. In some embodiments, image processing unit 410 can identify one or more pixels in the first frame that do not have corresponding pixels in the second frame. Image processing unit 410 may further identify one or more regions including the identified pixels (also referred to as the "non-overlapping regions"). The non-overlapping region(s) may correspond to motion of sensor(s) 230. In some embodiments, pixels in the non-overlap regions of the first frame that have no corresponding pixels in the second frame may be omitted from further processing (e.g., processing by displacement determination unit 420 and/or depth determination unit 430).

In some embodiments, image processing unit 410 may recognize intensities of pixels in the first frame and of corresponding pixels in the second frames. In some embodiments, the intensities of pixels in the first frame and of corresponding pixels in the second frames may be obtained as a standard for determining a difference between the first frame and the second frame. For example, RGB intensity may be selected as a standard for determining a difference between the first frame and the second frame. The pixels, the corresponding pixels and the RGB intensities may be transmitted to displacement determination unit 420 and/or depth determination unit 430 for determination of a displacement and a depth for the second frame. In some embodiments, the depth may represent a space depth of an object in the two frames. In some embodiments, displacement information may be a set of displacements of frames. In some embodiments, depth information may be a set of depths of frames. The frames, the displacement information and the depth information may be used to build a map.

Displacement determination unit 420 can determine displacement information based on data provided by image processing unit 410 and/or any other data. The displacement information may include one or more displacements that may represent motion information of one of sensor(s) 230 that generate the image data (e.g., an image sensor capturing multiple frames). For example, displacement determination unit 420 can obtain data about corresponding pixels in two frames, such as the first frame and the second frame. The data may include, for example, one or more values of the corresponding pixels, such as gray values, intensities, etc. of the pixels. Displacement determination unit 420 can determine values of the pixels based on any suitable color model, such as a RGB (red, green, and blue) model, an HSV (hue, saturation, and lightness) model, etc. In some embodiments, displacement determination unit 420 can determine differences between values of pairs of corresponding pixels in two frames. For example, image processing unit 410 can identify a first pixel in the first frame and its corresponding pixel in the second frame (e.g., a second pixel). The second pixel can be determined based on a transformation of coordinates of the first pixel. The first pixel and the second pixel may correspond to the same object. Displacement determination unit 420 can further determine a difference between a value of the first pixel and a value of the second pixel. In some embodiments, a displacement may be determined by minimizing a sum of the differences between the pairs of corresponding pixels in the first frame and the second frame.

In some embodiments, displacement determination unit 420 can determine an initial displacement $\xi_{ji,1}$ representing an origin estimated value of displacement. For example, the initial displacement $\xi_{ji,1}$ may be determined based on equation (1) as follows:

$$\xi_{ji,1} = \underset{\xi_{ji}}{\mathrm{argmin}} \int_{\Omega} |I_i(x) - I_j(\omega(x, D_i(x), \xi_{ji}))|_\delta dx, \quad (1)$$

wherein x denotes coordinates of a pixel in the first frame; $\omega(x,D_i(x),\xi_{ji})$ denotes coordinates of a corresponding pixel in the second frame, $\omega(x,D_i(x),\xi_{ji})$ and x may be at a same relative position of an object, and $\omega(x,D_i(x),\xi_{ji})$ is a transformed pixel of x after a displacement $\xi_{ji}$ of camera. $\Omega$ is a set of pixel pairs, each pair include a pixel in the first frame and a corresponding pixel in the second frame. $I_i(x)$ is a RGB intensity of pixel x and $I_j(\omega(x,D_i(x),\xi_{ji}))$ is a RGB intensity of pixel $\omega(x,D_i(x),\xi_{ji})$.

$\omega(x,D_i(x),\xi_{ji})$ is a transformed coordinate of pixel x after a displacement $\xi_{ji}$ of camera. In some embodiments, displacement determination unit 420 may calculate a corresponding pixel $\omega(x,D_i(x),\xi_{ji})$ based on a starting value $\xi_{ji}$ and an initial depth $D_i(x)$. In some embodiments, the initial depth $D_i(x)$ may be a zero matrix. In some embodiments, the starting value $\xi_{ji}$ may be a variable. For obtaining an initial displacement $\xi_{ji,1}$, displacement determination unit 420 may need a starting value $\xi_{ji}$ of displacement as shown in the iteration function (1). In some embodiments, the starting value $\xi_{ji}''$ of displacement may be determined based on a displacement $\xi_{ji}'$ of wheels and a displacement of camera relative to wheels. See the description of the starting value $\xi_{ji}$ elsewhere in the present disclosure at, for example, FIG. 17A and the description thereof. In some embodiments, the starting value of displacement may be a vector sum of $\xi_{ji}'$ and $\xi_{ji}''$. Trying the starting value and variables around the starting value $\xi_{ji}$, the minimum difference of two frames may be obtained.

In some embodiments, depth determination unit 430 can determine an updated depth $D_{i,1}(x)$. The updated depth $D_{i,1}(x)$ may be determined by function (2) as $$D_{i,1}(x) = \underset{D_i(x)}{\operatorname{argmin}} \int_\Omega |I_i(x) - I_j(\omega(x, D_i(x), \xi_{ji,1}))|_\delta dx, \quad (2)$$

wherein depth $D_i(x)$ denotes a variable for difference of two frames in function (2), determining a value $D_{i,1}(x)$ as the updated depth when the difference of two frames is minimum. In some embodiments, the initial depth $D_i(x)$ may be a zero matrix.

Displacement determination unit 420 may also produce an updated displacement $\xi_{ji,1u}$ based on the updated depth $D_{i,1}(x)$. In some embodiments, the updated displacement $\xi_{ji,1u}$ may be obtained based on function (1) by replacing the initial depth $D_i(x)$ with the updated depth $D_{i,1}(x)$.

Loop-closure control unit 440 may perform loop-closure detection. For example, loop-closure control unit 440 can detect whether robot 110 returns a previously-visited location and can update displacement information based on the detection. In some embodiments, in response to determining that robot 110 has returned to a previously-visited location in a route, loop-closure control unit 440 may adjust the updated displacements of frames using a general graph optimization (g2o) detection loop to reduce errors. The g2o is a general optimization framework for reducing non-linear errors. The adjusted updated displacements of frames may be set as displacement information. In some embodiments, if robot 110 includes a depth sensor, such as a Lidar, depths may be obtained directly, displacements may be determined based on function (1), and then the displacements may be adjusted by loop-closure control unit 440 to generate adjusted displacements.

Above all, when the depth information is detected by depth sensor, the displacement information may be a set of displacements based on function (1) and then adjusted by loop-closure control unit 440. When the depth information is a set of updated depths, the displacement information may be a set of the displacements after calculating function (1), function (2), function (1) and adjusted by loop-closure control unit 440.

In some embodiments, loop-closure control unit 440 may generate a map based on frames, the displacement information and the depth information.

Analysis module 310 may also include an object detection unit 450, object detection unit 450 may detect obstacles, objects and distance from robot 110 to the obstacles and objects. In some embodiments, the obstacles and objects may be detected based on data obtained by sensor(s) 230.

For example, object detection unit 450 may detect an object based on distance data captured by a sonar, an infrared distance sensor, an optical flow sensor or a Lidar.

Figure 5:
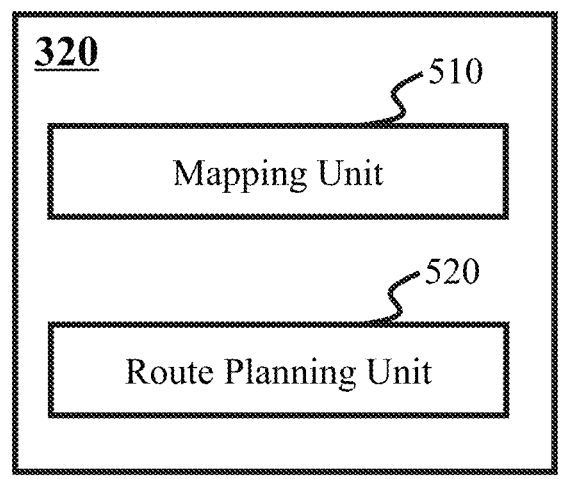
FIG. 5 is a block diagram of an exemplary navigation module in processor according to an embodiment of present disclosure.

FIG. 5 is a block diagram of an exemplary navigation module 320 in processor 210. In some embodiments, navigation module 320 may include a mapping unit 510 and a route planning unit 520. In some embodiments, mapping unit 510 may receive a map from database 140. In some embodiments, mapping unit 510 may process the map for route planning. In some embodiments, the map may be a part of an entire map in database 140. For example, a map including a determined destination and location of robot 110 may be suitable for planning a route. In some embodiments, the map obtained from database 140 may be a 3D map. In some embodiments, mapping unit 510 may transfer the 3D map to a 2D map by projection technology. That is, mapping unit 510 may segment objects in the 3D map into pixels and project the pixels to the horizontal land surface to generate a 2D map. Once the 2D map is obtained by mapping unit 510, route planning unit 520 may plan a route from location of robot 110 to a destination based on the transferred 2D map.

Robot control module 330 may determine control parameters based on the route planned by route planning unit 520 in navigation module 320. In some embodiments, robot control module 330 may segment the route into a set of segments. Robot control module 330 may obtain a set of joints of the segments. In some embodiments, a joint between two segments may be a stop of a former segment and a start of a latter segment. Control parameters for a segment may be determined based on a start and a stop.

In some embodiments, during a movement of robot 110 in a segment, the stop point of robot 110 may mismatch with a predetermined stop of the segment, route planning unit 520 may plan a new route based on the mismatched stop (a new location of robot 110) and the destination. In some embodiments, robot control module 330 may segment the new route and generate one or more new segments, then robot control module 330 may determine a set of control parameters for each new segment.

Figure 6:
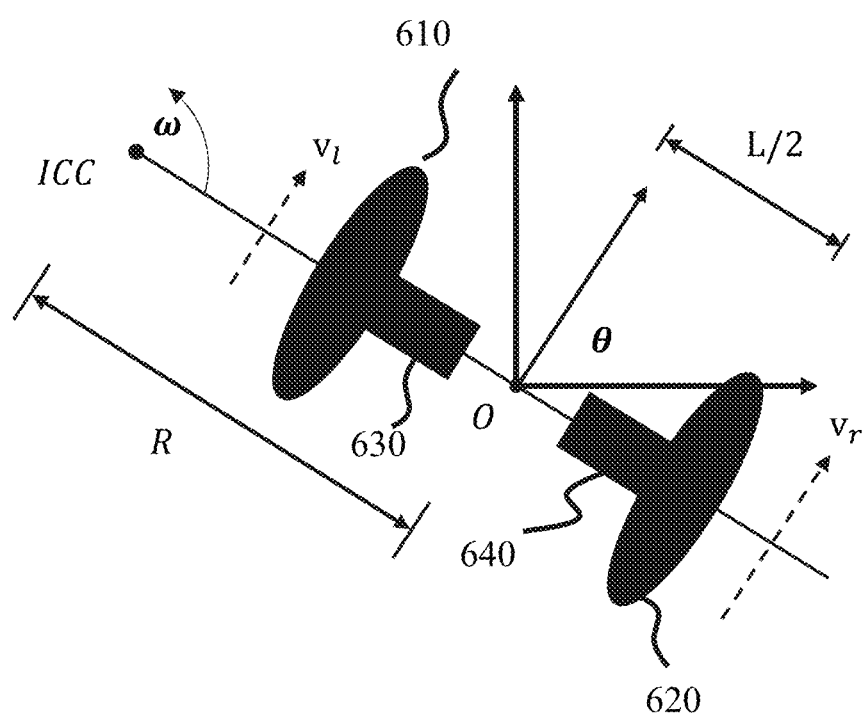
FIG. 6 is an example of movement control of robot according to an embodiment of present disclosure.
Figure 7:
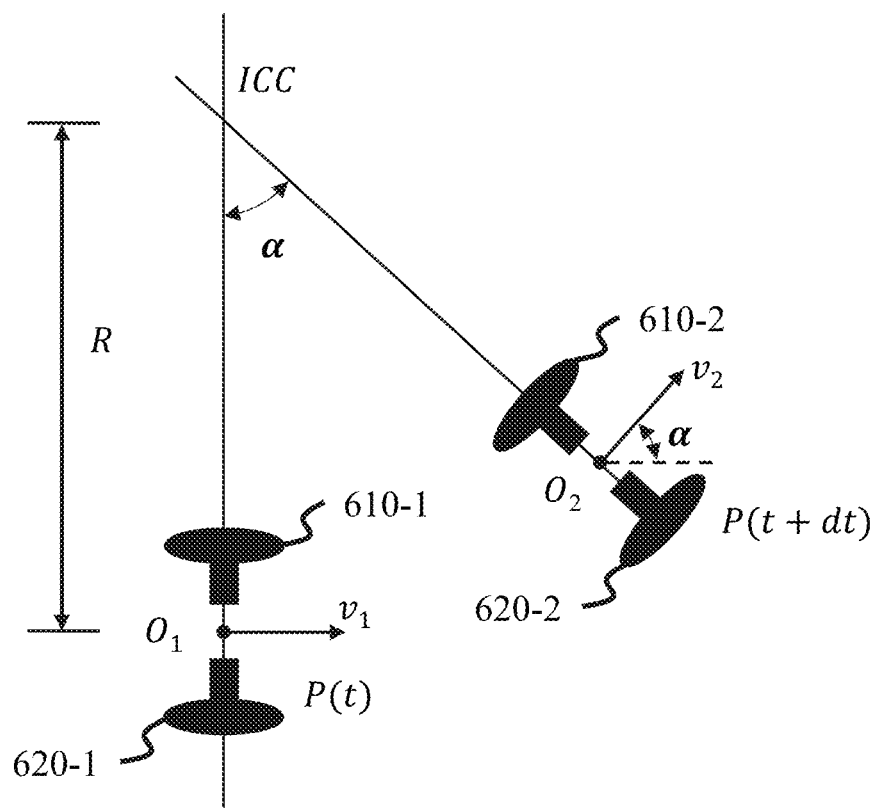
FIG. 7 is an example of movement control of robot according to an embodiment of present disclosure.

FIGS. 6 and 7 are examples of movement control of robot 110. As shown in FIG. 6, a movement module is moving around a point ICC with an angular velocity ω. Movement module has two wheels including a left wheel 610 moving with velocity $v_l$ and a right wheel 620 moving with velocity $v_r$. In some embodiments, left wheel 610 and right wheel 620 may have a distance L. Left wheel 610 and right wheel 620 both have a distance L/2 to a central point 0 of the two wheels. The central point 0 and the point ICC have a distance R.

FIG. 7 shows an example of determining control parameters of robot 110. As shown in FIG. 7, movement module of robot 110 moves from point $0_1$ to point $0_2$ within dt. Point $0_1$ and point $0_2$ have an angle α relative to point ICC. With dt, L, R and α, velocity $v_l$ of the left wheel and velocity $v_r$ of the right wheel can be figured out.

Figure 8:
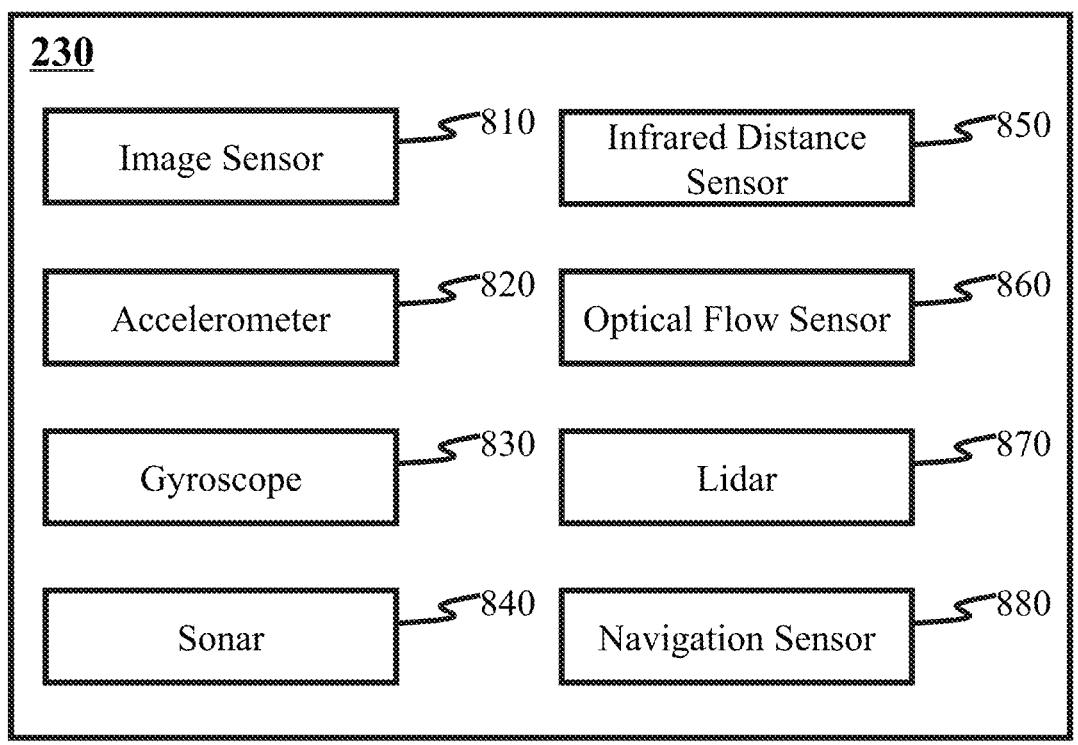
FIG. 8 is a block diagram illustrating an exemplary architecture of the sensor(s) in FIG. 2 according to an embodiment of present disclosure.

FIG. 8 is a block diagram illustrating an exemplary architecture of sensor(s) 230 in FIG. 2 according to an embodiment of present disclosure. Sensor(s) 230 may include an image sensor 810, an accelerometer 820, a gyroscope 830, a sonar 840, an infrared distance sensor 850, an optical flow sensor 860, a Lidar 870 and a navigation sensor 880.

Image sensor 810 may capture image data. In some embodiments, analysis module 310 may build a map based on the image data. In some embodiments, the image data may include frames, initial depth of each pixel in each frame and displacements. In some embodiments, the initial depth and displacements may be used for determining depth and displacement. Details regarding the obtainment of the depth and displacement may be found elsewhere in the present disclosure. (e.g., the description in connection with function (1) in FIG. 4). In some embodiments, the displacements may include a displacement of wheels and a displacement of camera relative to wheels between a time interval when two adjacent frames are taken.

Accelerometer 820 and gyroscope 830 may function together to keep balance of a movement module and a gimbal. The balance may be necessary for obtaining stable information from sensor(s) 230. In some embodiments, accelerometer 820 and gyroscope 830 may function together to restrain a pitch attitude within a threshold. In some embodiments, accelerometer 820 and gyroscope 830 may be both held by the movement module and the gimbal. See the description of balance keeping elsewhere in the present disclosure at, for example, FIG. 18 and FIG. 19, and the description thereof.

Sonar 840, infrared distance sensor 850 and optical flow sensor 860 may function to locate robot 110. In some embodiments, any one or any combination of sonar 840, infrared distance sensor 850 and optical flow sensor 860 may be adopted to locate robot 110.

Lidar 870 may detect a depth of an object in a frame. That is, Lidar 870 may obtain depth for each frame, there is no need for calculating a depth by analysis module 310 in processor 210, and depth obtained by Lidar 870 may be used directly to calculate a displacement as described in function (1) in FIG. 4. The displacement obtained based on function (1) may be adjusted by loop-closure control unit 440.

Sonar 840, infrared distance sensor 850 and optical flow sensor 860 may locate robot 110 by detecting a distance between robot 110 and an object or obstacle, navigation sensor 880 may locate robot 110 in a rough area or location. In some embodiments, navigation Sensor 880 may locate robot 110 with any type of positioning system such as Global positioning system (GPS), Beidou navigation or positioning system, and Galileo Positioning System.

Figure 9:
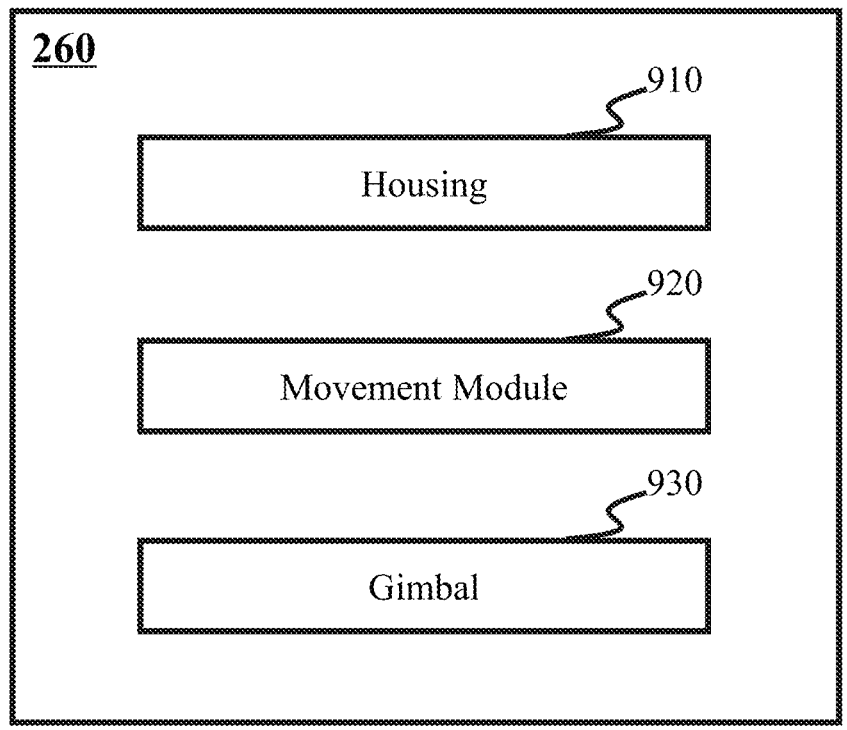
FIG. 9 is a block diagram of an exemplary robot body in robot illustrated in FIG. 2 according to some embodiments of the present disclosure.

FIG. 9 is a block diagram of an exemplary robot body 260 in robot 110 illustrated in FIG. 2 according to some embodiments of the present disclosure. Robot body 260 may include a housing 910, a movement module 920 and a gimbal 930. Housing 910 may be a casing of robot body 260, the casing of robot body 260 may protect modules and units in robot 110. Movement module 920 may be a movement operator in robot 110. In some embodiments, movement module 920 may move based on control parameters generated by robot control module 330 in processor 210. For example, in a segment of a route determined by robot control module 330, control parameters may be determined based on a start and a stop of the segment. Then the control parameters may be transmitted from robot control module 330 to movement module 920 to make robot 110 move from the start to the stop. In some embodiments, gimbal 930 may be a holding component for at least one of sensors described in FIG. 8. Gimbal 930 may hold an image sensor 810 such as a camera to obtain frames. In some embodiments, gimbal 930 may hold image sensor 810 to capture frames. In some embodiments, gimbal 930 may hold accelerator 820 and gyroscope 830, keeping balance of sensors held by gimbal to obtain stable information. In some embodiments, gimbal 930 may hold at least one of sonar 840, infrared distance sensor 850 and optical flow sensor 860 to detect a distance between robot 110 and an object or an obstacle. In some embodiments, gimbal 930 may also hold Lidar 870 or other sensors to detect depth information or other information. In some embodiments, navigation sensor 880 may be installed in gimbal 930. In some embodiments, sensors held by gimbal 930 may be integrated into a smart phone.

Figure 10:
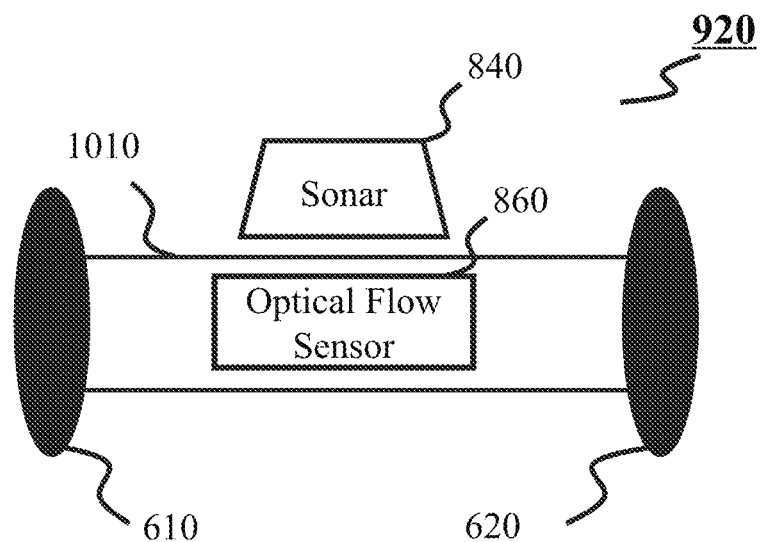
FIG. 10 shows an example of movement module according to an embodiment of present disclosure.

FIG. 10 shows an example of movement module 920. Movement module 920 may include a motion unit and a carrier 1010. The motion unit may include two wheels, and the two wheels may include a left wheel 610 and a right wheel 620. Carrier 1010 may carry sonar 840 or optical flow sensor 860 to detect objects or obstacles. In some embodiments, carrier 1010 may include accelerometer 820 (not shown in FIG. 10) and gyroscope 830 (not shown in FIG. 10) to keep balance of movement module 920. In some embodiments, carrier 1010 may include other sensors such as infrared distance sensor 850 to obtain other needed information.

Figure 11:
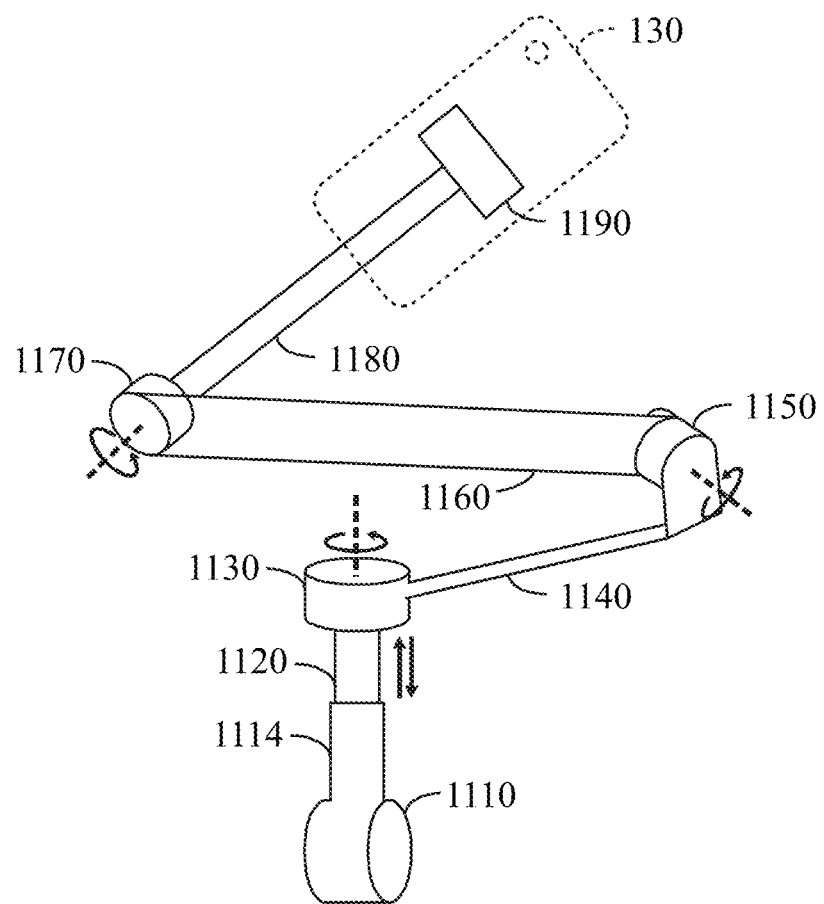
FIG. 11 is an example of diagram of an exemplary gimbal in robot body illustrated in FIG. 9 according to some embodiments of the present disclosure.

As described in FIG. 9, gimbal 930 may hold sensor(s) 320 to obtain information to generate a map, plan a route or generate control parameters. FIG. 11 is an example of diagram of an exemplary gimbal 930 in robot body 260 illustrated in FIG. 9 according to some embodiments of the present disclosure. In some embodiments, gimbal 930 may include a rotor 1170 controlling rotation around X axis, a rotor 1150 controlling rotation around Y axis and a rotor 1130 controlling rotation around Z axis. The X axis may be a first axis in a horizontal plane. The Y axis may be a second axis in the horizontal plane. The Z axis may be a vertical axis perpendicular to the horizontal plane. In some embodiments, gimbal 930 may include a rod 1180 connecting rotor 1170 and sensors, a rod 1160 connecting rotor 1150, and rotor 1170, and a rod 1140 connecting rotor 1130, and rotor 1150. In some embodiments, gimbal 930 may include a connecting part 1110 and a connecting rod 1114, and a dynamic Z-buffering rod 1120. In some embodiments, sensors may be integrated in a user equipment 130 (e.g., a smart phone). User equipment 130 may include sensors such as image sensor 810, accelerometer 820, gyroscope 830, and navigation sensor 880. A connecting block 1190 may also be included for holding user equipment 130 in gimbal 930. During an operation of gimbal 930, information may be obtained by sensors in user equipment 130. In some embodiments, sensors in user equipment 130 may be controlled by adjusting attitude of gimbal 930 to obtain proper information. In some embodiments, attitude of gimbal 930 may be adjusted by rotating rotor 1170, rotor 1150 and rotor 1130 around X, Y and Z axis.

Traditional 3-axis gimbal may be used in aerial photography. To make gimbal 930 stable during movement in a route, dynamic Z-buffering rod 1120 is adopted in gimbal 930. Dynamic Z-buffering rod 1120 may keep stabilization in Z axis. In some embodiments, dynamic Z-buffering rod 1120 may be a telescopic rod expanding and retracting along with Z axis. Method for operating dynamic Z-buffering rod 1120 in gimbal 930 may be illustrated in FIG. 20. Rotation of rotator 1130, 1150 and 1170 and vertical movement of dynamic Z-buffering rod 1120 may be controlled based on control parameters generated by robot control module 330.

Figure 12:
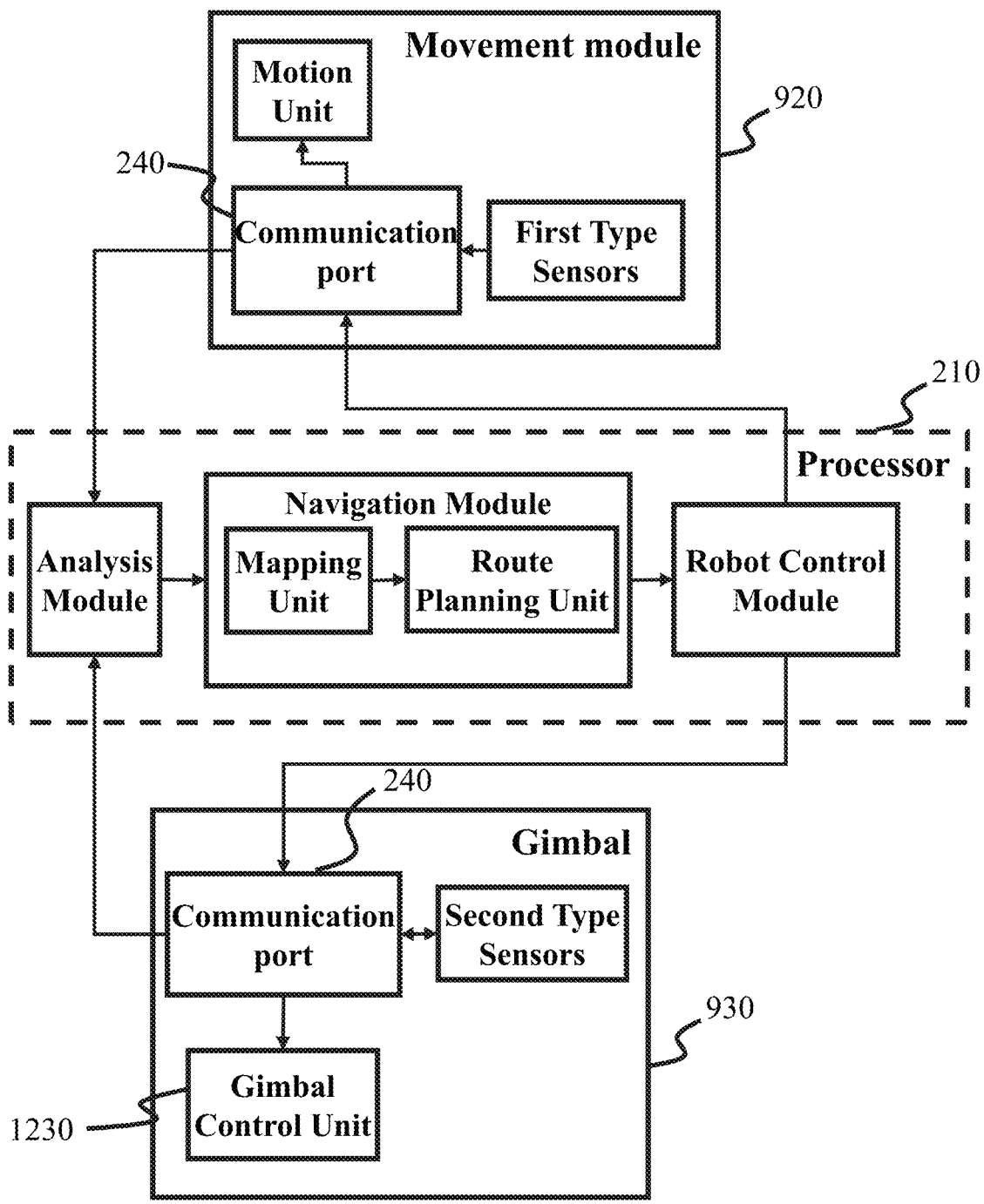
FIG. 12 shows a simple system of robot according to some embodiments of the present disclosure.

There may be a plurality of modules and units in robot 110, FIG. 12 shows a simple system of robot 110 according to some embodiments of the present disclosure. As shown in FIG. 12, robot 110 may be comprised by processor 210, movement module 920 and gimbal 930. In some embodiments, processor 210 may include analysis module 310, navigation module 320 and robot control module 330. Movement module 920 may include a motion unit 1210, first type sensors 1220 and communication port 240. Gimbal 930 may include a gimbal control unit 1230, communication port 240 and second type sensors 1240. In some embodiments, processor 210 may transmit control parameters to control motion unit 1210 in movement module 920 and gimbal control unit 1230 in gimbal 930.

In some embodiments, first type sensors 1220 and second type sensors 1240 may obtain information. Analysis module 310 may process the obtained information and build a map. In some embodiments, the built map may be transmitted to database 140. For determining a route to a destination, a map may be needed for navigation, analysis module 310 may download a latest map from database 140 and transmit it to navigation module 320. Navigation module 320 may process the latest map and determine a route from where robot locates to the destination. In some embodiments, an entire map may be stored in database 140. In some embodiments, analysis module 310 may not download the entire map, a part of the entire map including location of robot 110 and the destination may be enough for planning the route. In some embodiments, the map built by analysis module 310 may include location of robot 110 and the destination, and the map is latest in database 140, the map built by analysis module 310 may be transmitted to navigation module 320 for planning the route. Navigation module 320 may include mapping unit 510 and route planning unit 520. In some embodiments, mapping unit 510 may generate a 2D map for route planning based on the latest map from analysis module 310 or the built map. Route planning unit 520 may plan a route, the route may be transmitted to robot control module 330. Robot control module 330 may segment the route into one or more segments. Robot control module 330 may also generate control parameters for each segment. For each segment, there is a start and a stop, the stop of a segment may be a start of a next segment. In some embodiments, the stop location of robot 110 during a segment may mismatch with a predetermined stop for this segment, which may influence the remaining part of the route. It is necessary to re-plan a route, based on the mismatched location (a new location of robot 110) and the destination. In some embodiments, after a segment, the re-planning process may be operated by navigation module 320 if a mismatch is detected.

In some embodiments, information captured by first type sensors 1220 in movement module 920 and second type sensors 1240 in gimbal 930 may not proper to build a map if first type sensors 1220 in movement module 920 and second type sensors 1240 in gimbal 930 are not stable, robot control module 330 may generate control parameters to adjust attitude of movement module 920 and gimbal 930 to stabilize first type sensors 1220 and second type sensors 1240.

Sensors may be installed in both movement module 920 and gimbal 930. In some embodiments, first type sensors 1220 may include at least one of accelerometer 820, gyroscope 830, sonar 840, infrared distance sensor 850, optical flow sensor 860, Lidar 870 and navigation sensor 880. In some embodiments, second type sensors 1240 may include at least one of image sensor 810, accelerometer 820, gyroscope 830, sonar 840, infrared distance sensor 850, optical flow sensor 860, Lidar 870, and navigation sensor 880.

As shown in FIG. 12, processor 210 may establish communication with movement module 920 and gimbal 930 by communication port 240. In some embodiments, communication port 240 may be with any form. For example, communication port 240 may be a wired or wireless transceiver. In some embodiments, communication port 240 may be implemented as an interface for interactive communication. For example, communication port 240 may establish communication between processor 210 and other part of robot 110 by circuits using API. In some embodiments, API is a set of subroutine definitions, protocols, and tools for building software and applications. API may make it easier to develop a program by providing all building blocks, which are then put together. In some embodiments, the API protocol may be used to design a circuit for wireless communication such as Wi-Fi, Bluetooth, Infrared (IR), Ultra-Wide band (UWB), ZigBee, and the like, or as a mobile communication module, such as 3G, 4G, or Long Term Evolution (LTE). API may separate bottom hardware (e.g., movement module 920 or gimbal 930) and control part (e.g., processor 210). In some embodiments, processor 210 (e.g., a part of a smart phone) may control movement of wheels in movement module 920 and attitude of image sensor (e.g. a camera) in gimbal 930 by invoking the API in communication port 240. In some embodiments, first type sensors 1220 in movement module 920 may transmit information (e.g., location data) to the smart phone. In some embodiments, second type sensors 1240 in gimbal 930 may transmit information (attitude of the camera) to the smart phone.

Figure 13:
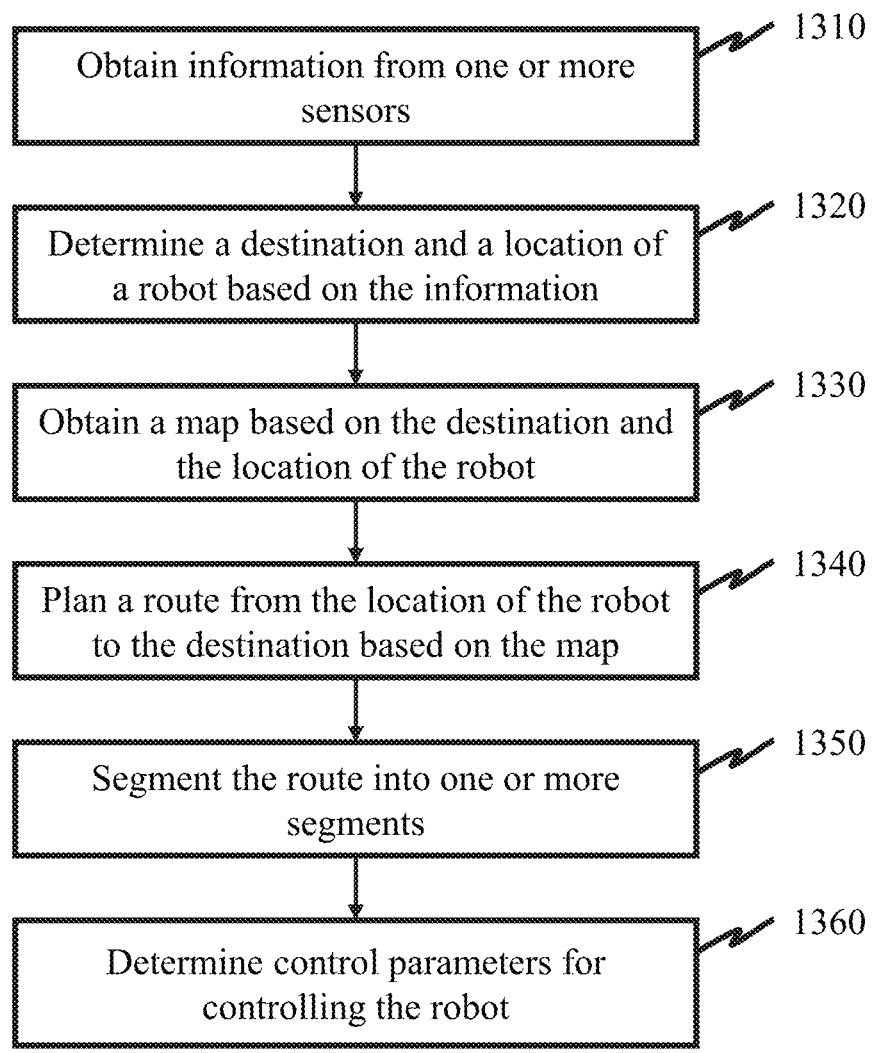
FIG. 13 is a flowchart of an exemplary process for determining control parameters to control robot according to an embodiment of present disclosure.

FIG. 13 is a flowchart of an exemplary process 1300 for determining control parameters to control robot 110. Process 1300 may be performed by processor 210 of robot 110 based on instructions stored in storage 220.

In step 1310, processor 210 may obtain information from sensor(s) 230. As described in FIG. 3 and FIG. 12, analysis module 310 in processor 210 may receive information from first type sensors 1220 in movement module 920 and second type sensors 1240 in gimbal 930 through API communication port 240. In some embodiments, the information may be analyzed to control movement of robot 110. In some embodiments, the information may be analyzed to keep stabilization of movement module 920 and gimbal 930 in robot 110.

In step 1320, processor 210 may determine a destination and a location of robot 110 based on the received information. For example, analysis module 310 in processor 210 may receive location data from sensors 230 (e.g., a sonar, an infrared distance sensor, an optical flow sensor, a Lidar or a navigation sensor). In some embodiments, the destination may be determined by a user through I/O interface 250. For example, a user may input the destination for the robot 110. The information of destination may be used by processor 210 to figure out a route for movement of robot 110. In some embodiments, processor 210 may determine a location of robot 110 based on the received information. In some embodiments, processor 210 may determine a location of robot 110 based on information obtained by sensor(s) 230. For example, processor 210 may determine a rough location of robot 110 based on information obtained by navigation sensor 880 using a positioning system (e.g., GPS). For another example, processor 210 may determine a precise location of robot 110 based on information obtained by at least one of sonar 840, infrared distance sensor 850 and optical flow sensor 860.

In step 1330, processor 210 may obtain a map based on the destination and the location of robot 110. The map may be used to plan a route. In some embodiments, an entire map including a plurality of points of a city may be stored in database 140. When the destination and the location of robot 110 are determined by processor 210 in step 1310 and step 1320, a map including the location of robot 110 and the destination may be needed for planning a route between the location and the destination. In some embodiments, the map including the location of robot 110 and the destination may be part of the entire map. In some embodiments, analysis module 310 in processor 210 may obtain a right part of the entire map from database 140 based on the destination and location of robot 110. In some embodiments, analysis module 310 may build a map based on information obtained by sensor(s) 230. The built map may be transmitted to database 140 to update the entire map. In some embodiments, the built map may contain the location of robot 110 and the destination. The map generated may be used by the navigation module 320 to plan a route.

In step 1340, a route may be planned from the location of robot 110 to the destination based on the obtained map in step 1330. The planning of route may be performed by navigation module 320. In some embodiments, as illustrated in FIG. 12, navigation module 320 may convert the obtained map to a 2D map by mapping unit 510. The route planning unit 520 may then plan a route from the location of robot 110 to the destination based on the 2D map.

In step 1350, robot control module 330 may segment the planned route into one or more segments. The segmentation of the route may be based on a threshold. For example, if the length of the planned route is shorter than a threshold, the segmentation of the route may not be performed. In some embodiments, the segmentation operation may be performed by robot control module 330 based on instructions stored in storage 220.

In step 1360, robot control module 330 may determine control parameters for controlling the robot based on the one or more segments in step 1350. In some embodiments, each segment segmented by robot control module 330 in step 1350 may have a start point and a stop point. In some embodiments, robot control module 330 may determine control parameters for a segment based on the start and the stop. Examples for determining control parameters between two points may be found in FIG. 6 and FIG. 7. In some embodiments, control parameters may be time dependent. For example, when a robot 110 passes point one and point two in a straight line in a segment, the robot 110 may take different velocities within different time frames from point one to point two. In some embodiments, control parameters may be used to stabilize robot 110 during its movement along a route. For example, movement module 920 and gimbal 930 may be stabilized so as to sense information accurately. For another example, along a bumpy route, the control parameters may be used to maintain the stability of gimbal 930 along the vertical axis.

In some embodiments, when robot 110 goes through a segment based on predetermined control parameters, robot 110 may stop at a mismatched point relative to the predetermined stop point for the segment by robot control module 330. Navigation module 320 may re-plan a new route based on the mismatched point (a new location) of robot 110 and the destination. Robot control module 330 may segment the new route into one or more new segments, robot control module 330 may determine new control parameters of robot 110 for the one or more new segments. In some embodiments, the mismatch may be estimated after each segment by comparing a real location with a predetermined stop for the segment.

Figure 14:
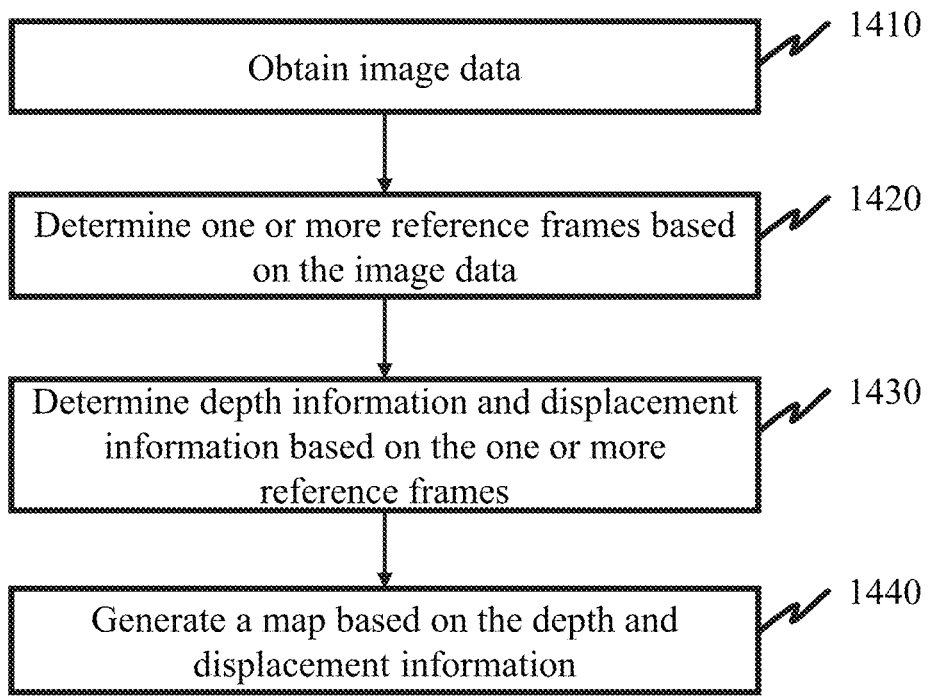
FIG. 14 is a flowchart of an exemplary process for building a map by processor according to an embodiment of present disclosure.

FIG. 14 is a flowchart of an exemplary process 1400 for generating a map by processor 210. The process for building a map may be performed by analysis module 310 based on information obtained by sensor(s) 230.

In step 1410, analysis module 310 may obtain image data from image sensor 810. In some embodiments, image data may include a plurality of frames, an initial depth for each pixel in the frames and/or displacements. The displacements may include a displacement of wheels and a displacement of camera relative to wheels. In some embodiments, initial depth may be set as a zero matrix. In some embodiments, depth information may be obtained by image sensors 810, if a depth sensor such as a Lidar or a camera with depth detecting function is included in sensor(s) 230.

In step 1420, one or more reference frames may be determined by analysis module 310 based on image data. In some embodiments, the image data may include a plurality of frames, an initial depth for each pixel in the frames and/or displacements. In some embodiments, analysis module 310 may select one or more reference frames from the plurality of frames. See the description elsewhere in the present disclosure at, for example, FIG. 15 and the description thereof. In some embodiments, the one or more reference frames may be used to build a map.

In step 1430, analysis module 310 may determine depth information and displacement information based on the one or more reference frames. That is, image data may be processed by analysis module 310 for obtaining displacement information and depth information for each frame. Method for determining displacement information and depth information may be found elsewhere in the present disclosure. See, for example, FIG. 4 and the description thereof.

In step 1440, analysis module 310 may generate a map based on the one or more reference frames, the depth information and the displacement information. In some embodiments, a 3D map may be generated by connecting the one or more reference frames with their corresponding displacements.

The map may be determined based on the plurality of reference frames and their corresponding displacement information and depth information. In some embodiments, there may be no particular order for step 1420 and step 1430. For example, step 1420 for determining one or more reference frames may include step 1430 for determining displacement information and depth information. That is, step 1430 may be a sub-step for determining one or more reference frames in step 1420. As described in FIG. 4, image data may be processed and generate one or more results. In some embodiments, the one or more results may include displacement information and depth information (e.g., displacement of the camera within adjacent two frames, depth of an object in two adjacent frames). In some embodiments, the one or more results may be adjusted by a g2o loop detection technique to generate adjusted displacement information. In some embodiments, the adjusted displacement information may be used to generate a map as the displacement information. Analysis module 310 may generate a map based on one or more reference frames and their corresponding depth information and displacement information.

Figure 15:
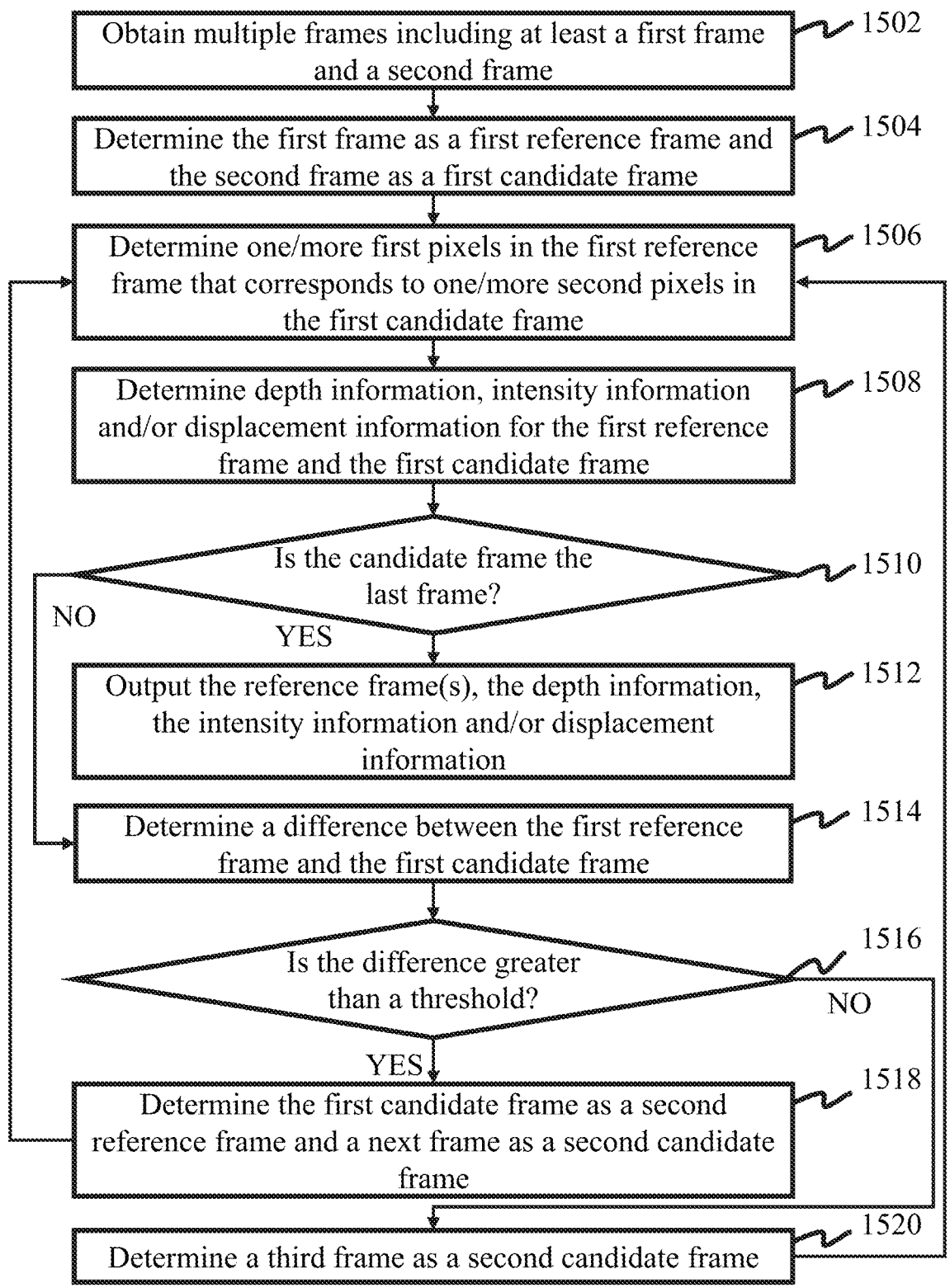
FIG. 15 is a flowchart of an exemplary process for determining one or more reference frames according to an embodiment of present disclosure.

FIG. 15 is a flowchart of an exemplary process 1500 for determining one or more reference frames. The process may be performed by analysis module 310, displacement determination unit 420 and depth determination unit 430 based on image data obtained by image sensor 810. More specifically, analysis module 310 may determine one or more reference frames based on the one or more results (e.g., displacement information and depth information).

In step 1502, analysis module 310 may obtain image data including a plurality of frames. The plurality of frames may include at least a first frame and a second frame. In some embodiments, the first frame may be a prior frame and the second frame may be a subsequent frame of the first frame. That is, image sensor 810 may capture the first frame at one moment and capture the second frame at the next moment. That is, the multiple frames may be adjacent to each other in time domain.

In step 1504, analysis module 310 may determine the first frame as a first reference frame and the second frame as a first candidate frame.

In step 1506, analysis module 310 may determine one or more first pixels in the first reference frame that corresponds to one or more second pixels in the first candidate frame. In some embodiments, the first reference frame and the first candidate frame may have overlapping regions. The first pixels and the second pixels may indicate the same positions of an object in the overlapping regions of the first reference frame and the first candidate frame. In some embodiments, the one or more first pixels may be a set of pixels Ω described in FIG. 4. In some embodiments, the first reference frame and the first candidate frame may have no overlapping regions. That is, a region in the first reference frame may have no corresponding region in the first candidate frame. Pixels in the first reference frame and the first candidate frame may not be chosen as the first pixels and/or the second pixels.

In step 1508, analysis module 310 may determine depth information, intensity information and/or displacement information for the first reference frame and the first candidate frame. Refer to description in connection with FIG. 4 for the method for determining the depth information, the intensity information and the displacement information.

In step 1510, analysis module 310 may determine whether the candidate frame is the last frame. That is, analysis module 310 may detect whether next frame to the candidate frame with respect to the time domain exists. If yes, then the process goes to step 1512, otherwise the process goes to step 1514.

In step 1512, analysis module 310 may output the reference frame and its corresponding depth and/or displacement if the candidate frame is the last frame. In some embodiments, analysis module 310 may traverse the plurality of frames to obtaining all reference frames and their corresponding depth information and displacement information.

In step 1514, analysis module 310 may determine a difference between the first reference frame and the first candidate frame. In some embodiments, the difference between the first reference frame and the first candidate frame may be determined based on intensity information of the first reference frame and the first candidate frame. In some embodiments, intensity of the first reference frame may be determined by RGB intensity of the one or more first pixels. The intensity of the first candidate frame may be determined by RGB intensity of the one or more second pixels. In some embodiments, intensity information of the first reference frame and the first candidate frame may be determined in step 1504. In some embodiments, intensity information of the first reference frame and the first candidate frame may be determined in step 1514 before determining the difference between the first reference frame and the first candidate frame.

In step 1516, analysis module 310 may determine whether the difference between the first reference frame and the first candidate frame is greater than a threshold. If yes, then the process goes to step 1518, otherwise the process goes to step 1520.

In step 1518, if the difference between the first reference frame and the first candidate frame is greater than a threshold, analysis module 310 may designate the first candidate frame as second reference frame and designate the next frame that follows the first candidate frame in the plurality of frames as second candidate frame. In some embodiments, the next frame that follows the candidate frame may be a frame immediately adjacent to the candidate frame. The process 1500 may then send the second reference frame and the second candidate frame to step 1506 to repeat the processing.

In step 1520, if the difference between the first reference frame and the first candidate frame is not greater than a threshold, analysis module 310 may designate a third frame that follows the first candidate frame in the plurality of frames as second candidate frame. The process 1500 may then send the second reference frame and the second candidate frame to step 1506 to repeat the processing.

In some embodiments, step 1518 or step 1520 may output a new reference frame and a new candidate frame to be analyzed by analysis module 310. In some embodiments, the new reference frame may be generated by replacing the reference frame with the candidate frame when the difference between the reference frame and the candidate frame is greater than a threshold. In some embodiments, the candidate frame may be generated by replacing the candidate frame by a next frame or a third frame. That is, the replacement of candidate frame may be unconditional, the replacement of reference frame may be conditional.

The process 1500 may be terminated when a map is generated in step 1512. In some embodiments, some termination criteria may be designated so that the process 1500 may end in a timely manner. For example, a counter may be implemented in the process 1500 so that the number of cycles in the process 1500 may not be larger than a predetermined threshold value.

Figure 16:
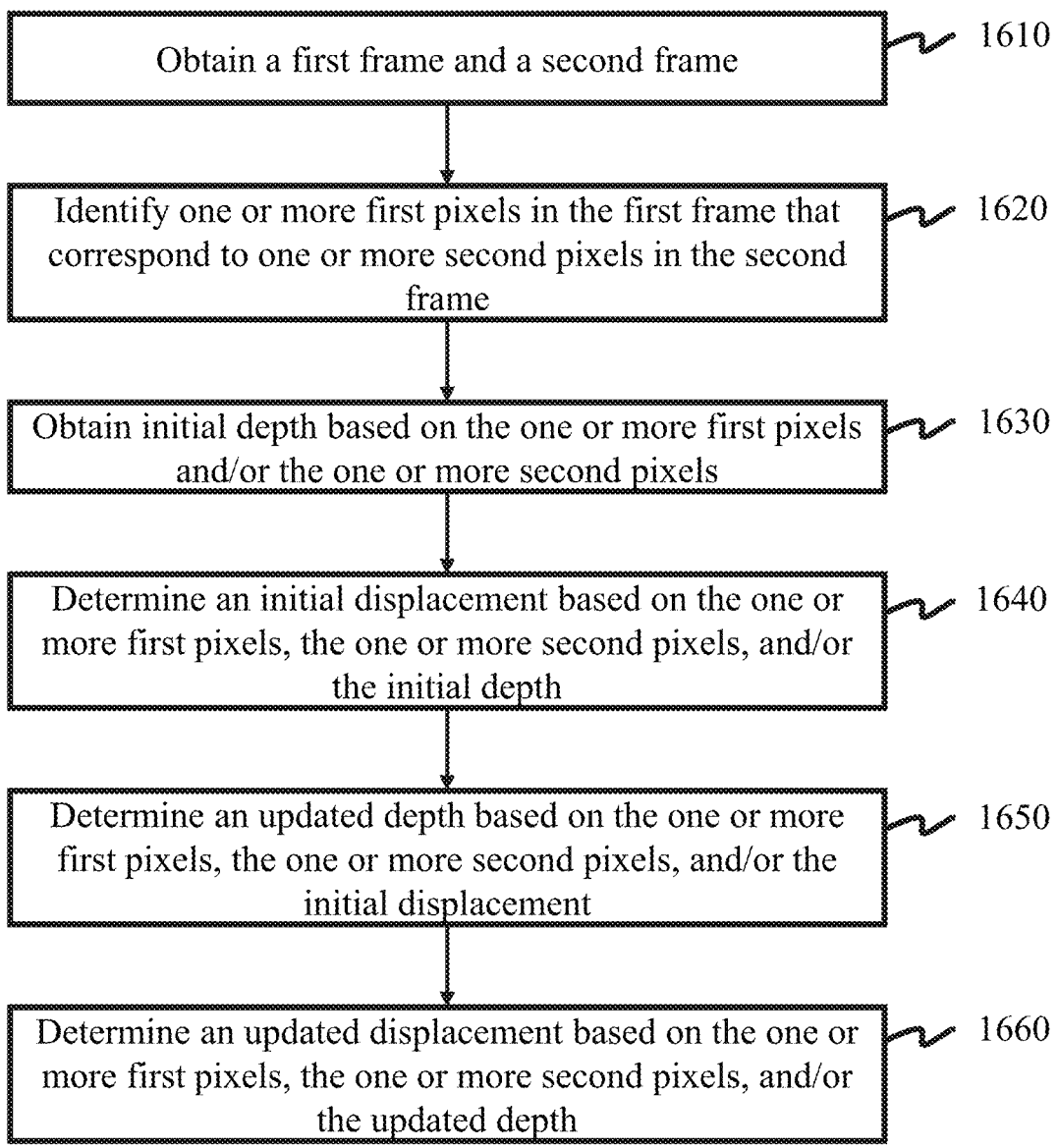
FIG. 16 is a flowchart of an exemplary process for obtaining depth information, intensity information and displacement information according to an embodiment of present disclosure.

FIG. 16 is a flowchart of an exemplary process 1600 for obtaining depth information and displacement information of the reference frame and/or the candidate frame. In some embodiments, the process may be performed by analysis module 310. In some embodiments, the process may be similar to method of obtaining a displacement and a depth for a frame as described in FIG. 4.

In step 1610, analysis module 310 may obtain a first frame and a second frame from the multiple frames obtained by image sensor 810. In some embodiments, analysis module 310 may select the first frame and the second frame from a plurality of frames image sensors captured. In some embodiments, the first frame and the second frame may be adjacent to each other with respect to time domain. The first frame may be a prior frame and the second frame may be a subsequent frame.

In step 1620, analysis module 310 may identify one or more first pixels in the first frame that correspond to one or more second pixels in the second frame. Identification of pixels in the first frame to those in the second frame may be performed using the procedure described in step 1506 as illustrated in FIG. 15.

In step 1630, analysis module 310 may obtain an initial depth based on the one or more first pixels and the one or more second pixels. In some embodiments, the initial depth may be set as a zero matrix. In step 1640, analysis module 310 may determine an initial displacement based on the one or more first pixels, the one or more second pixels and/or the initial depth. For example, step 1640 may be performed using function (1) as described in FIG. 4.

In step 1650, analysis module 310 may determine an updated depth based on the one or more first pixels, the one or more second pixels and the initial displacement. In some embodiments, step 1650 may be performed using function (2) as described for FIG. 4.

In step 1660, analysis module 310 may determine an updated displacement based on the one or more first pixels, the one or more second pixels, and/or the updated depth. In some embodiments, step 1660 may be performed using function (1) as described for FIG. 4 by replacing the initial depth with the updated depth.

As illustrated in the description for FIG. 4, an initial displacement may be calculated for determining displacement in function (1). As shown in function (1), a starting value of displacement may be needed for determining an initial displacement. FIG. 17A is a flowchart of an exemplary process 1700 for determining a starting value of displacement. This process may be performed by analysis module 310 based on image data obtained by image sensor 810.

In step 1710, image data may be obtained by analysis module 310. In some embodiments, the starting value of displacement may be determined based on the image data. More specifically, the starting value of displacement may be determined based on displacements in the image data. In some embodiments, displacements in the image data may include a displacement of motion unit (the two wheels) and a displacement of camera relative to motion unit between a time interval when two adjacent frames are taken.

In step 1720, analysis module 310 may obtain a first displacement associated with a motion unit based on the image data. In some embodiments, the motion unit may include two wheels. In some embodiments, the first displacement associated with the motion unit may be a displacement of central point of the two wheels within a time period. In some embodiments, the first displacement associated with the motion unit may be a displacement of a point where the navigation sensor is installed within a time period. In some embodiments, navigation sensor may be installed in the central point of the two wheels. In some embodiments, the time period may be a time between image sensor 810 taking two frames.

In step 1730, analysis module 310 may obtain a second displacement associated with image sensor 810 with respect to the motion unit. In some embodiments, the second displacement may be a relative displacement of image sensor 810 relative to the motion unit. In some embodiments, image sensor 810 may be a camera.

In step 1740, analysis module 310 may determine a third displacement associated with image sensor 810 based on the first displacement and the second displacement. In some embodiments, the third displacement may be calculated as a vector sum of the first displacement and the second displacement. In some embodiments, the third displacement may be a starting value of displacement for determining the initial displacement.

During a movement of robot 110, gimbal needs to be controlled to obtain precise attitude of robot 110. In some embodiments, attitude of robot 110 may be controlled by controlling rotary angle of axis in gimbal 930. FIG. 17B shows a flowchart of an exemplary process 1705 for determining attitude of robot 110. The process may be performed by analysis module 310 based on rotary angle of axis in gimbal 930.

In step 1715, image data may be obtained by analysis module 310. As described in FIG. 17A, image data may include frames, displacements and initial depth. In some embodiments, image data may also include rotary information.

In step 1725, analysis module 310 may obtain a first rotary angle with respect to a reference axis. The first rotary angle may be associated with the movement module 920 (e.g., part of the movement module 920, a motion unit) based on the image data. In some embodiments, the first rotary angle with respect to the reference axis associated with a motion unit may be obtained based on rotary information from image data. In some embodiments, the first rotary angle may be an angle within a time period. In some embodiments, the time period may be a time between image sensor 810 taking two frames.

In step 1735, analysis module 310 may obtain a second rotary angle with respect to the movement module 920 (e.g., part of the movement module 920, the motion unit) associated with image sensor 810 within the time period. In some embodiments, the second rotary angle may be a relative angle of image sensor 810 relative to the motion unit. In some embodiments, image sensor 810 may be a camera.

In step 1745, analysis module 310 may determine a third rotary angle associated with image sensor 810 with respect to the reference axis. In some embodiments, the third rotary angle may be determined based on the first rotary angle and the second rotary angle. In some embodiments, the third angle may be calculated as a vector sum of the first rotary angle and the second rotary angle.

Figure 18:
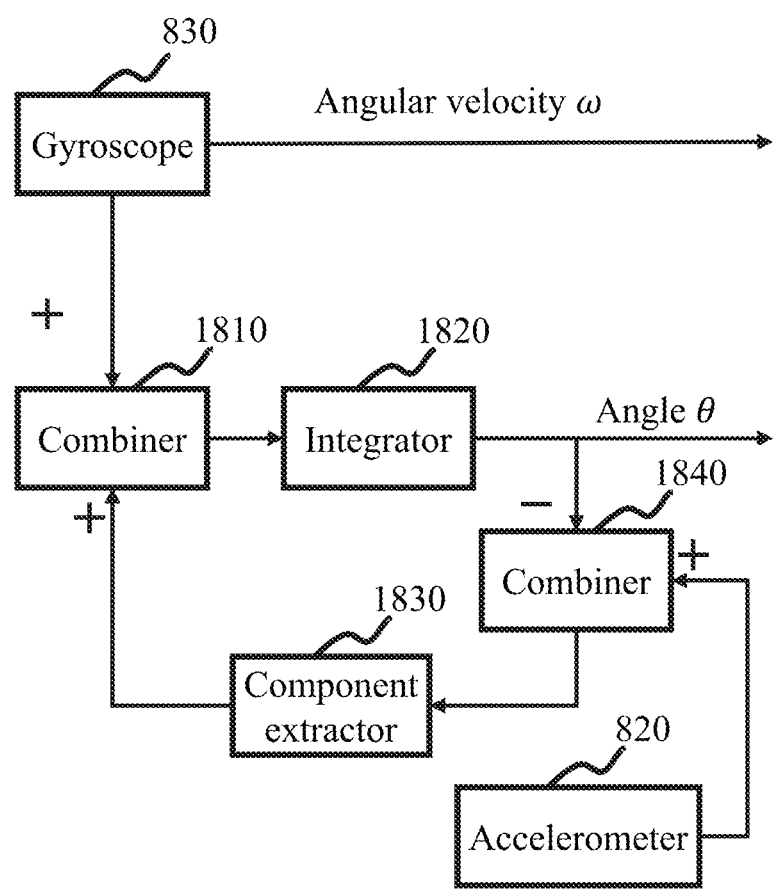
FIG. 18 shows a block diagram of how gyroscope and accelerometer determine the angle between the horizontal plane and the Z axis according to an embodiment of present disclosure.

During movement of robot 110, sensor(s) 230 may be installed in movement module 920 and gimbal 930 to sense information. In some embodiments, sensor(s) 230 may be installed in the carrier 1010, or sensors may be installed in a smart phone held by gimbal 930. In some embodiments, movement module 920 and gimbal 930 may need all-directional stabilization to obtain precise and reliable information. FIG. 18 describes a method of keeping balance relative to horizontal plane.

FIG. 18 gives an exemplary block diagram 1800 showing how gyroscope and accelerometer determine the angle between the horizontal plane and the Z axis. In some embodiments, the horizontal plane may be a carrying plane of carrier 1010. The angle between the horizontal plane and the Z axis may be determined based on gyroscope data and accelerometer data. In some embodiments, the horizontal plane may be a relative plane of gimbal 930 to detect pitch angle of gimbal 930.

As shown in FIG. 18, the system may include a combiner 1810, an integrator 1820, a combiner 1840 and a component extractor 1830. Combiner 1810, integrator 1820, combiner 1830 and component extractor 1840 may form a feedback loop for determining an output angle. For each frame obtained by image sensor 810, an angle between the horizontal plane and the Z axis may be obtained by integrator 1820. Assuming that a first frame is taken by image sensor 810 at time $t_1$, a second frame is taken by image sensor 810 at time $t_2$. At time $t_1$ and $t_2$, angular velocities and angles may be obtained by gyroscope 830 and accelerometer 820. In some embodiments, a feedback output angle $\theta_1$ associated with the first frame at time $t_1$, the gyroscope data and the accelerometer data at time $t_2$ may be processed to determine an output angle $\theta_2$ associated with the second frame at time $t_2$.

Firstly, the gyroscope data and the accelerometer data of the first frame may be processed at time $t_1$. Integrator 1820 may generate an output angle $\theta_1$ associated with the first frame. Accelerometer 820 may generate a first angle $\theta_1'$. The combiner 1840 may generate a second angle $\theta_1''$ based on the output angle $\theta_1$ and the first angle $\theta_1'$. In some embodiments, the second angle $\theta_1''$ may be calculated by vector subtracting the output angle $\theta_1$ from the first angle $\theta_1'$. A compensatory angular velocity $\omega_1''$ may be determined by component extractor 1830 based on the second angle $\theta_1''$. In some embodiments, component extractor 1830 may be a differentiator.

Secondly, the gyroscope data and the accelerometer data of the second frame may be processed at time $t_2$. Gyroscope 830 may generate an angular velocity $\omega_2$. Combiner 1810 may generate a revised angular velocity $\omega_2'$ based on the angular velocity $\omega_2$ and the compensatory angular velocity $\omega_1''$. In some embodiments, the revised angular velocity $\omega_2'$ may be calculated as vector sum of angular velocity $\omega_2$ and compensatory angular velocity $\omega_1''$. As a result, integrator 1820 may output an angle $\theta_2$ associated with the second frame at time $t_2$ based on revised angular velocity $\omega_2'$.

In some embodiments, method described in FIG. 18 may be performed by processor 210. For example, gyroscope data and accelerometer data may be transmitted to processor 210 (e.g., a part of a smart phone) through an API communication port. For each frame, processor 210 may determine an output angle at the time when the frame is captured. In some embodiments, angle between the horizontal plane and the Z axis may be detected at each time of taking each frame. Horizontal balance may be kept based on the real time output angles associated with frames.

Figure 19:
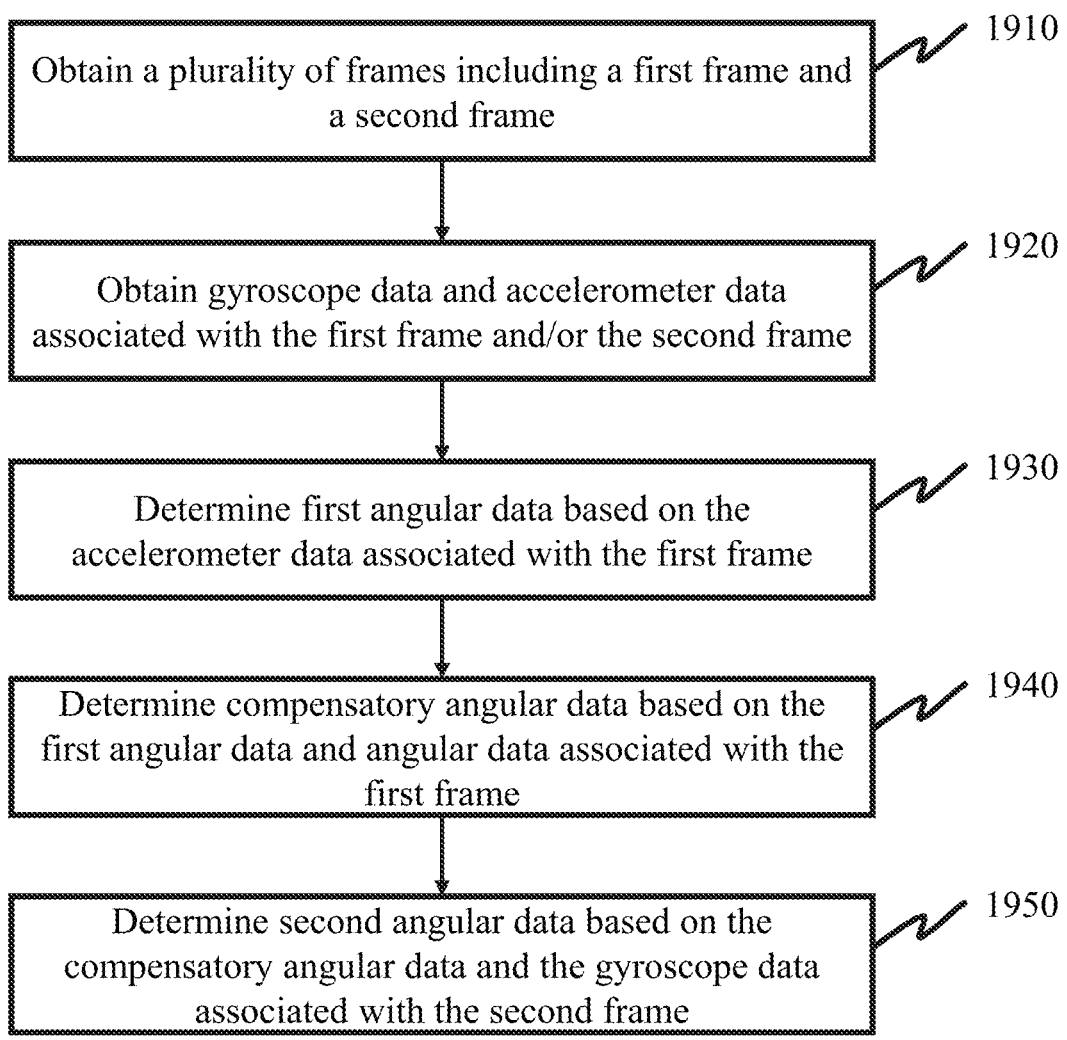
FIG. 19 is a flowchart of an exemplary process for determining an angle associated with a frame according to an embodiment of present disclosure.

FIG. 19 is a flowchart of an exemplary process 1900 for determining an angle associated with a frame. The process 1900 may be performed by processor 210.

In step 1910, processor 210 may obtain a plurality of frames including a first frame and a second frame. In some embodiments, the first frame and the second frame may be captured by image sensor 810 at adjacent moments. For example, a first frame is taken by image sensor 810 at time $t_1$, a second frame is taken by image sensor 810 at time $t_2$, time between $t_1$ and $t_2$ may be a sampling interval of image sensor 810.

In step 1920, gyroscope data and accelerometer data associated with the first frame and/or the second frame may be obtained by processor 210. In some embodiments, gyroscope data and accelerometer data may include parameters such as angular velocities and angles.

In step 1930, processor 210 may determine a first angular data based on the accelerometer data associated with the first frame. In some embodiments, the first angular data may include first angle.

In step 1940, processor 210 may determine a compensatory angular data based on the first angular data and angular data associated with the first frame. In some embodiments, the angular data associated with the first frame may be an output angle associated with the first frame. In some embodiments, the first angular data may be processed by vector subtracting the output angle associated with the first frame. In some embodiments, the compensatory angular data may be a compensatory angular velocity. The compensatory angular velocity may be determined by component extractor 1830 based on the subtraction of output angle associated with the first frame from the first angular data.

In step 1950, processor 210 may determine a second angular data based on the compensatory angular data and the gyroscope data associated with the second frame. In some embodiments, the second angular data may be an angle between the horizontal plane and the Z axis detected by processor 210 associated with the second frame at time $t_2$ when the second frame is taken.

As illustrated in FIG. 18 and FIG. 19, the output angle associated with the second frame may be fed back by the output angle associated with the first frame. With this cycle and gyroscope data and accelerometer data, output angle for each frame may be obtained by processor 210. In some embodiments, the angle between the horizontal plane and the Z axis may exceed a threshold, then a control signal for keeping balance may be generated.

Method for keeping horizontal balance of movement module 920 or gimbal 930 is illustrated in FIG. 18 and FIG. 19. During a movement of robot 110, sensors installed in a smart phone held by gimbal 930 may obtain information. In some embodiments, the information may include image data, gyroscope data, accelerometer data and data obtained by other sensors. Horizontal balance needs to be kept by processor 210 to make the second type sensors 1240 in the smart phone obtain information stably. On the other hand, road may be not plain for second type sensors 1240 in a smart phone held by gimbal 930 to obtain information stably. In some embodiments, balance of the vertical axis may also be necessary for sensors in the smart phone to obtain stable information.

Figure 20:
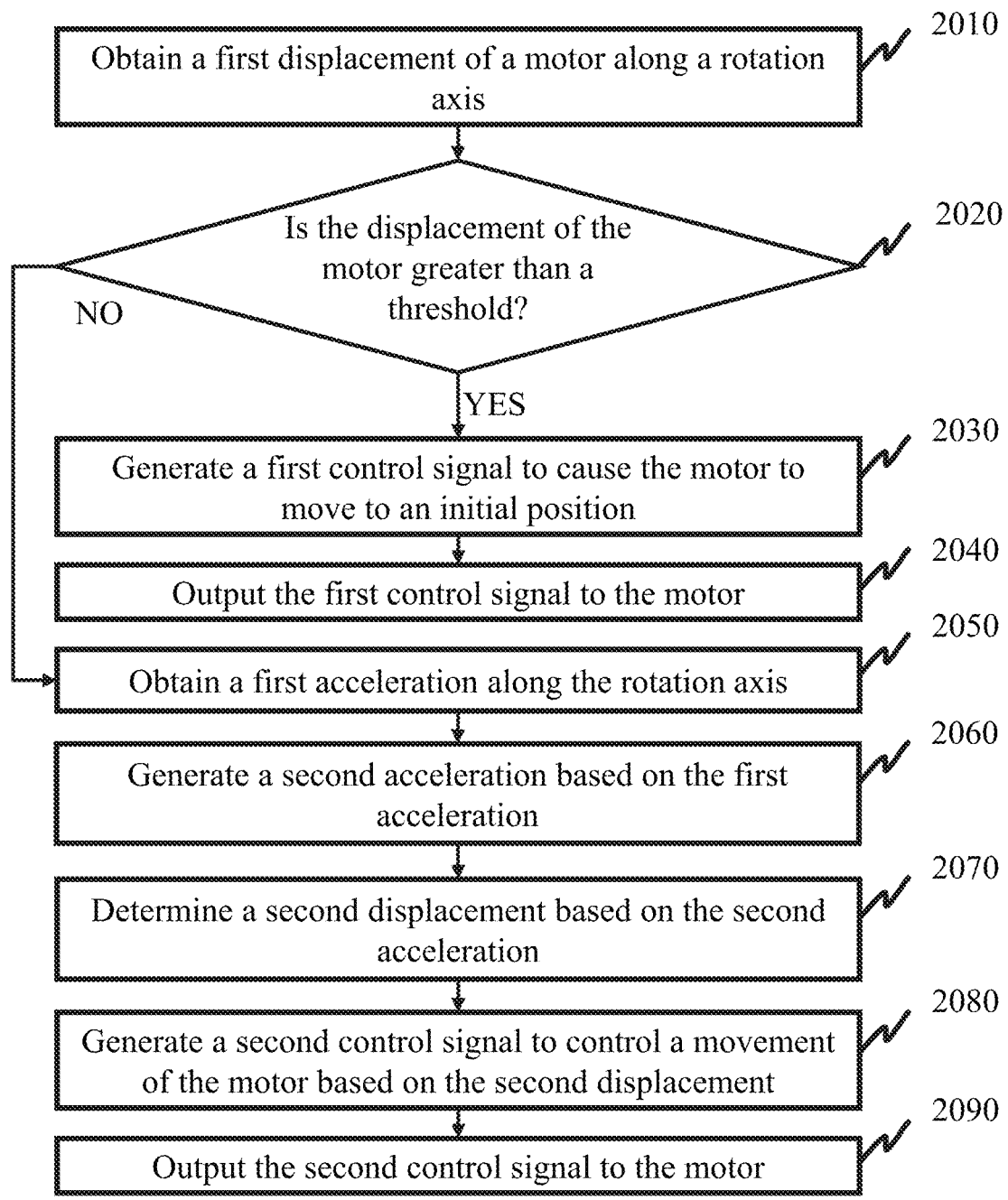
FIG. 20 is a flowchart of an exemplary process for adjusting vertical movement of sensors in a smart phone according to an embodiment of present disclosure.

FIG. 20 is a flowchart of an exemplary process 2000 for adjusting vertical movement of second type sensors 1240 in a smart phone. In some embodiments, the process may be performed by processor 210 by controlling the dynamic Z-buffering rod 1120 shown in FIG. 11 based on control parameters generated by robot control module 330.

In step 2010, processor 210 may obtain a first displacement of a motor along a rotation axis. In some embodiments, the rotation axis may be Z axis. In some embodiments, the first displacement may be a vector along with Z axis.

In step 2020, processor 210 may determine whether the displacement of the motor along Z axis is greater than a threshold. In some embodiments, the threshold may be a limit within which second type sensors 1240 can obtain information stably.

In step 2030, processor 210 may generate a first control signal to cause the motor to move to an initial position when the displacement of the motor is greater than a threshold. In some embodiments, the initial position may be a position preset and suitable for obtaining information.

In step 2040, processor 210 may output the first control signal to the motor to make second type sensors 1240 installed in a smart phone back to the initial position to obtain stable information.

In step 2050, processor 210 may obtain a first acceleration along the rotation axis when the displacement of the motor is not greater than a threshold. In some embodiments, the acceleration may be obtained by accelerometer 820 installed in the smart phone.

In step 2060, processor 210 may generate a second acceleration based on the first acceleration. In some embodiments, the second acceleration may be a filtered acceleration of the first acceleration.

In step 2070, processor 210 may determine a second displacement based on the second acceleration. In some embodiments, the second displacement may be calculated based on an integral value of the second acceleration. In some embodiments, the second displacement may be a vector along with Z axis.

In step 2080, processor 210 may generate a second control signal to control movement of motor based on the second displacement. In some embodiments, the second control signal may determine a remaining tolerance of displacement based on the second displacement and the threshold, then processor 210 may control the movement of the sensors in the smart phone along with Z axis.

In step 2090, processor 210 may output the second control signal to the motor.

While the present disclosure has been shown and described with reference to various embodiments thereof, it will be understood by those skilled in the art that various changes in form and details may be made therein without departing from the spirit and scope of the present disclosure, as defined by the appended claims and their equivalents.

We claim:

1. A robot comprising:
a movement module including wheels, a carrier, and first type sensors;
a gimbal including second type sensors;
a processor including a controller,
wherein the processor is configured to:
establish communication with the gimbal and the movement module respectively;
  obtain information from the second type sensors and the first type sensors respectively, wherein the information includes image data;
  determine at least one reference frame with pixels based on the image data;
  determine depth information and displacement information based on the image data corresponding to the at least one reference frame;
  determine a destination and a location of the robot;
  generate a map based on the at least one reference frame, the depth information, and the displacement information, wherein the map is downloadable by each of a plurality of systems connected to a database;
  plan a route from the location of the robot to the destination for the robot based on the map;
  determine control parameters for the robot based on the route and the information; and
  control movement and attitude of the robot based on the control parameters;
wherein to determine the at least one reference frame with pixels based on the image data, the processor is configured to:
  obtain a plurality of frames including at least a first frame and a second frame;
  determine the first frame as a first reference frame and the second frame as a first candidate frame, the first reference frame being one of the at least one reference frame;
  determine at least one first pixel in the first reference frame that corresponds to at least one second pixel in the first candidate frame;
  determine the depth information, intensity information, and the displacement information for the first reference frame and the first candidate frame;
  output the first reference frame, the depth information, the intensity information, and the displacement information for the first reference frame and the first candidate frame if the first candidate frame is a last frame in the plurality of frames;
  determine a difference between the first reference frame and the first candidate frame based on the intensity information of the first reference frame and the first candidate frame if the first candidate frame is not the last frame in the plurality of frames;
  determine the first candidate frame as a second reference frame and a next frame in the plurality of frames as a second candidate frame if the difference between the first reference frame and the first candidate frame is greater than a threshold, the second reference frame being one of the at least one reference frame;
  determine a third frame in the plurality of frames as the second candidate frame if the difference between the first reference frame and the first candidate frame is not greater than the threshold; and
  traverse the plurality of frames to obtain the at least one reference frame and the corresponding depth information and the corresponding displacement information.

2. The robot of claim 1, wherein the processor communicates with the gimbal and the movement module using Application Program Interface respectively.

3. The robot of claim 1, wherein the processor is further configured to:
segment the route into one or more segments; and
determine the control parameters for controlling the robot based on the one or more segments.

4. The robot of claim 1, wherein the processor is further configured to:
obtain a first rotary angle with respect to a reference axis associated with the movement module based on the image data;
obtain a second rotary angle with respect to the movement module associated with an image sensor; and
determine, based on the first rotary angle and the second rotary angle, a third rotary angle with respect to the reference axis associated with the image sensor.

5. The robot of claim 4, wherein the third rotary angle is a vector sum of the first rotary angle and the second rotary angle.

6. The robot of claim 1, wherein the processor is further configured to:
obtain initial depth information based on the at least one first pixel in the first reference frame and/or the at least one second pixel in the first candidate frame;
determine an initial displacement of an image sensor based on a starting value of displacement of the image sensor and/or the initial depth information;
determine updated depth information based on the at least one first pixel in the first reference frame, the at least one second pixel in the first candidate frame, and/or the initial displacement of the image sensor; and
determine an updated displacement of the image sensor based on the starting value of displacement of the image sensor and/or the updated depth information.

7. The robot of claim 6, wherein the processor is further configured to:
obtain a first displacement associated with the wheels based on the image data;
obtain a second displacement associated with the image sensor with respect to the wheels;
determine a third displacement associated with the image sensor based on the first displacement and the second displacement; and
set the third displacement as the starting value of displacement for determining the initial displacement.

8. The robot of claim 7, wherein the third displacement is a vector sum of the first displacement and the second displacement.

9. A method comprising:
establishing communication between a processor and a gimbal, between the processor and a movement module;
obtaining, by the processor, information from second type sensors and first type sensors respectively, wherein the information includes image data;

determining at least one reference frame with pixels based on the image data;

determining depth information and displacement information based on the image data corresponding to the at least one reference frame;

determining, by the processor, a destination and a location of a robot;

obtaining, by the processor, a map based on the at least one reference frame, the depth information, and the displacement information, wherein the map is downloadable by each of a plurality of systems connected to a database;

planning, by the processor, a route from the location of the robot to the destination based on the map;

determining control parameters for the movement module and the gimbal based on the route and the information; and controlling movement and attitude of the robot based on the control parameters;

wherein determining the at least one reference frame with pixels based on the image data, the method comprises:

obtaining a plurality of frames including at least a first frame and a second frame;

determining the first frame as a first reference frame and the second frame as a first candidate frame, the first reference frame being one of the at least one reference frame;

determining at least one first pixel in the first reference frame that corresponds to at least one second pixel in the first candidate frame;

determining the depth information, intensity information, and the displacement information for the first reference frame and the first candidate frame;

outputting the first reference frame, the depth information, the intensity information, and the displacement information for the first reference frame and the first candidate frame if the first candidate frame is the last frame in the plurality of frames;

determining a difference between the first reference frame and the first candidate frame based on the intensity information of the first reference frame and the first candidate frame if the first candidate frame is not the last frame in the plurality of frames;

determining the first candidate frame as a second reference frame and a next frame in the plurality of frames as a second candidate frame if the difference between the first reference frame and the first candidate frame is greater than a threshold, the second reference frame being one of the at least one reference frame;

determining a third frame in the plurality of frames as the second candidate frame if the difference between the first reference frame and the first candidate frame is not greater than the threshold; and traversing the plurality of frames to obtain the at least one reference frame and the corresponding depth information and the corresponding displacement information.

10. The method of claim 9, wherein the processor communicates with the gimbal and the movement module using Application Program Interface respectively.

11. The method of claim 9, further comprising:
segmenting, by the processor, the route into one or more segments; and
determining the control parameters for controlling the robot based on the one or more segments.

12. The method of claim 9, further comprising:
obtaining a first rotary with respect to a reference axis associated with the movement module based on the image data;
obtaining a second rotary angle with respect to the movement module associated with an image sensor; and
determining, based on the first rotary angle and the second rotary angle, a third rotary angle with respect to the reference axis associated with the image sensor.

13. The method of claim 12, wherein the third rotary angle is a vector sum of the first rotary angle and the second rotary angle.

14. The method of claim 9, further comprising:
obtaining initial depth information based on the at least one first pixel in the first reference frame and/or the at least one second pixel in the first candidate frame;
determining an initial displacement of an image sensor based on a starting value of displacement of the image sensor and/or the initial depth information;
determining updated depth information based on the at least one first pixel in the first reference frame, the at least one second pixel in the first candidate frame, and/or the initial displacement of the image sensor; and
determining an updated displacement of the image sensor based on the starting value of displacement and/or the updated depth information.

15. The method of claim 14, further comprising:
obtaining a first displacement associated with wheels based on the image data;
obtaining a second displacement associated with the image sensor with respect to the wheels;
determining a third displacement associated with the image sensor based on the first displacement and the second displacement; and
setting the third displacement as the starting value of displacement for determining the initial displacement.

16. The method of claim 15, wherein the third displacement is a vector sum of the first displacement and the second displacement.

* * * * *